United States Patent
Bassov et al.

(10) Patent No.: US 11,112,985 B2
(45) Date of Patent: Sep. 7, 2021

(54) DETECTING DATA DEDUPLICATION OPPORTUNITIES USING HASH DISTANCE

(71) Applicant: EMC IP Holding Company LLC, Hopkinton, MA (US)

(72) Inventors: Ivan Bassov, Brookline, MA (US); Philippe Armangau, Acton, MA (US); Sorin Faibish, Newton, MA (US); Istvan Gonczi, Berkley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/392,964

(22) Filed: Apr. 24, 2019

(65) Prior Publication Data

US 2020/0341666 A1    Oct. 29, 2020

(51) Int. Cl.
  *G06F 3/06*   (2006.01)
  *H04L 9/06*   (2006.01)
  *G06F 11/10*  (2006.01)

(52) U.S. Cl.
  CPC .......... *G06F 3/0641* (2013.01); *G06F 3/0608* (2013.01); *G06F 3/0673* (2013.01); *G06F 11/1004* (2013.01); *H04L 9/0643* (2013.01)

(58) Field of Classification Search
  CPC .... G06F 3/0641; G06F 3/0608; G06F 3/0673; G06F 3/0683; G06F 11/1004; H04L 9/0894; H04L 9/0643
  See application file for complete search history.

(56) References Cited

U.S. PATENT DOCUMENTS

| | | | | |
|---|---|---|---|---|
| 7,617,231 B2 * | 11/2009 | Moon | ...................... | G06F 21/64 |
| 8,442,942 B2 * | 5/2013 | Leppard | .............. | G06F 16/1752 |
| | | | | 707/616 |
| 2005/0125384 A1 * | 6/2005 | Gilfix | ...................... | G06F 16/10 |
| 2011/0238635 A1 * | 9/2011 | Leppard | .............. | G06F 16/1752 |
| | | | | 707/693 |

OTHER PUBLICATIONS

Ivan Bassov, et al., "Detecting Data Deduplication Opportunities Using Entropy-Based Distance," U.S. Appl. No. 16/393,025, filed Apr. 24, 2019.

(Continued)

*Primary Examiner* — Kalpit Parikh
(74) *Attorney, Agent, or Firm* — Muirhead and Saturnelli, LLC

(57) ABSTRACT

Techniques for processing data may include: receiving a candidate data block; computing a distance using a distance function, wherein the distance denotes a measurement of similarity between the candidate data block and a target data block; and determining, using the distance, whether to perform data deduplication of the candidate data block with respect to the target data block to identify at least one sub-block of the candidate data block that is a duplicate of at least one sub-block of the target data block. The distance may be computed using a bit-wise logical exclusive-or operation of the contents of the candidate data block and the target data block. The distance may be computed using a bit-wise logical exclusive-or operation of digests computed for the candidate and target data blocks using a distance preserving hash function. The target and candidate block may be similar if the distance is less than a threshold.

19 Claims, 15 Drawing Sheets

(56) References Cited

OTHER PUBLICATIONS

Sorin Faibish, "Elastically Managing Cache for Sub-Block Deduplication," U.S. Appl. No. 16/176,703, filed Nov. 15, 2018.
Philippe Armangau, "Deduplicating Data at Sub-Block Granularity," U.S. Appl. No. 16/176,729, filed Nov. 15, 2018.
Philip Shilane, et al., "Delta Compressed and Deduplicated Storage Using Stream-Informed Locality," EMC Corporation, Backup Recovery Systems Division, HotStorage'12 Proceedings of the 4th USENIX conference on Hot Topics in Storage and File Systems, pp. 10-10, Boston, MA , Jun. 13-14, 2012.
Philip Shilane, et al., "WAN Optimized Replication of Backup Datasets Using Stream-Informed Delta Compression," EMC Corporation, Backup Recovery Systems Division, Journal of ACM Transactions on Storage (TOS), vol. 8 Issue 4, Nov. 2012, Article No. 13.

* cited by examiner

DETECTING DATA DEDUPLICATION OPPORTUNITIES USING HASH DISTANCE

BACKGROUND

Technical Field

This application generally relates to data storage and, more particularly to data deduplication techniques.

Description of Related Art

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Some storage systems support data "deduplication." A common deduplication scheme involves replacing redundant copies of a data block with pointers to a single retained copy. Data deduplication may operate in the background, after redundant data blocks have been stored, and/or operate inline with storage requests. Inline deduplication matches newly arriving data blocks with previously stored data blocks and configures pointers accordingly, thus avoiding initial storage of redundant copies.

A common deduplication scheme involves computing digests of data blocks and storing the digests in a database. Each digest is computed as a hash of a data block's contents and identifies the data block with a high level of uniqueness, even though the digest is typically much smaller than the data block itself. Digests thus enable block matching to proceed quickly and efficiently, without having to compare blocks directly. For each digest, the database stores a pointer that leads to a stored version of the respective data block. To perform deduplication on a particular candidate block, a storage system computes a digest of the candidate block and searches the database for an entry that matches the computed digest. If a match is found, the storage system arranges metadata of the candidate block to point to the data block that the database has associated with the matching digest. In this manner, a duplicate copy of the data block is avoided.

SUMMARY OF THE INVENTION

Embodiments using the techniques herein may include a method, system, and computer readable medium for processing data comprising: receiving a candidate data block; computing a distance using a distance function, wherein the distance denotes a measurement of similarity between the candidate data block and a target data block; and determining, using the distance, whether to perform data deduplication of the candidate data block with respect to the target data block to identify at least one sub-block of the candidate data block that is a duplicate of at least one sub-block of the target data block. The distance function may compute the distance using a logical exclusive-or operation of the contents of the candidate data block and the target data block. The distance function may compute a normalized distance value as the distance. The processing may include determining whether the distance is less than a threshold distance. The processing may responsive to determining the distance is less than a threshold distance, determining the candidate data block is similar to the target data block and performing first processing. The first processing may include determining whether at least one sub-block of the candidate data block matches at least one sub-block of the target data block; and responsive to determining at least one sub-block of the candidate data block matches at least one sub-block of the target data block, performing second processing that stores the candidate data block as a partially deduplicated data block with at least one sub-block that is a duplicate of another sub-block of the target data block. The processing may include determining whether the distance is zero; and responsive to determining the distance is zero, determining that the candidate data block is a duplicate of the target data block and storing the candidate data block as a duplicate of the target data block. The distance function may compute the distance using a bit-wise logical exclusive-or operation of a first digest and a second digest, wherein the first digest may be computed for the candidate data block using a distance preserving hash function and wherein the second digest may be computed for the target data block using the distance preserving hash function. The distance function may compute a normalized distance value as the distance. The processing may include determining whether the distance is less than a threshold distance. The processing may include responsive to determining the distance is less than a threshold distance, determining the candidate data block is similar to the target data block and performing first processing. The first processing may include determining whether at least one sub-block of the candidate data block matches at least one sub-block of the target data block; and responsive to determining at least one sub-block of the candidate data block matches at least one sub-block of the target data block, performing second processing that stores the candidate data block as a partially deduplicated data block with at least one sub-block that is a duplicate of another sub-block of the target data block. The processing may include determining whether a third digest matches a fourth digest, wherein the third digest is computed for the candidate data block using a second hash function and wherein the fourth digest is computed for the target data block using the second hash function, wherein the second hash function is a stronger hash function than the first hash function; responsive to determining the third digest matches the fourth digest, comparing content of the candidate data block to content of the target data block; determining, in accordance with said comparing whether the candidate data block matches the target data block; and responsive to determining the candidate data block matches the target data block, storing the candidate data block as a fully deduplicated data block. The first hash function may be a non-cryptographic hash function and the second hash function may be a cryptographic hash function. The first hash function, that may be the distance preserving hash function, may be a cyclic redundancy check (CRC) function that computes a first checksum as the first digest for the candidate data block and computes a second checksum as the second digest for the target data block. The method may be performed as part of inline processing of the candidate data block in connection with an I/O path or data path when servicing an I/O accessing the candidate data block. The method may be performed offline and not as part of inline processing of the candidate data block in connection with an I/O path or data path when servicing an I/O accessing the candidate data block.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Unfortunately, conventional deduplication schemes fail to detect redundant data when blocks are similar but not identical. For example, a data storage system might store multiple copies of a given block, which are nearly identical except for a timestamp or label, which is unique to each copy. Owing to the randomizing nature of the hash function, digests computed from the slightly different copies of the data block differ widely from one another, such that deduplication is unable to detect the redundant content. Many opportunities to improve storage efficiency are therefore missed.

In contrast with the prior approach, an improved technique for performing data deduplication operates at sub-block granularity by searching a deduplication database for a match between a candidate sub-block of a candidate block and a target sub-block of a previously-stored target block.

When a match is found, the technique identifies a duplicate range shared between the candidate block and the target block and effects persistent storage of the duplicate range by configuring mapping metadata of the candidate block so that it points to the duplicate range in the target block.

Advantageously, improved techniques described herein avoid redundant storage of identical portions of data blocks, even when the data blocks as a whole are different. Storage efficiency is thereby improved.

It should be appreciated that embodiments are provided by way of non-limiting examples to illustrate certain features and principles of the techniques described herein. However, techniques herein are not limited to the particular embodiments described.

Described herein are improved techniques for performing data deduplication that may operate at sub-block granularity by searching a deduplication database for a match between a candidate sub-block of a candidate block and a target sub-block of a previously-stored target block.

When a match is found, the technique identifies a duplicate range shared between the candidate block and the target block and effects persistent storage of the duplicate range by configuring mapping metadata of the candidate block so that it points to the duplicate range in the target block.

Figure 1:
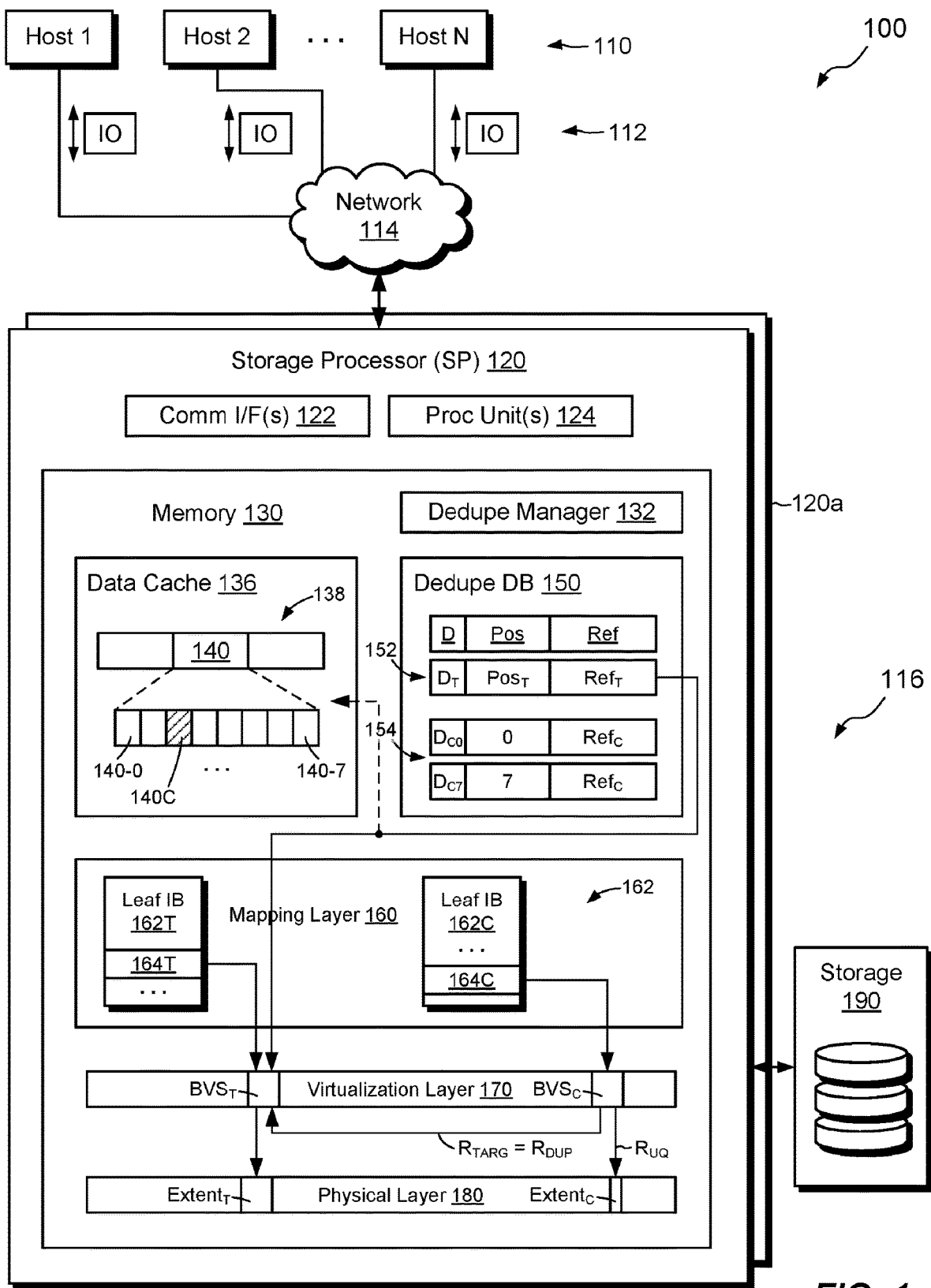
FIG. 1 is a block diagram of an example environment in which embodiments of the improved technique can be practiced.

FIG. 1 shows an example environment 100 in which embodiments of the improved techniques herein can be practiced. Here, multiple hosts 110 access a data storage system 116 over a network 114. The data storage system 116 includes a storage processor, or "SP," 120 and storage 190, such as magnetic disk drives, electronic flash drives, and/or the like. The data storage system 116 may include multiple SPs (e.g., a second SP 120a). For example, multiple SPs may be provided as circuit board assemblies or blades, which plug into a chassis that encloses and cools the SPs. The chassis has a backplane for interconnecting the SPs, and additional connections may be made among SPs using cables. In some examples, the SP 120 is part of a storage cluster, such as one which contains any number of storage appliances, where each appliance includes a pair of SPs connected to shared storage devices. In some arrangements, a host application runs directly on the SP (or SPs), such that separate host machines 110 need not be present. No particular hardware configuration is required, however, as any number of SPs may be provided, including a single SP, in any arrangement, and the SP 120 can be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the SP 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The SP 120 is configured to receive I/O requests 112 according to block-based and/or file-based protocols and to respond to such I/O requests 112 by reading or writing the storage 190.

The SP 120 includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the SP 120. The set of processing units 124 includes one or more processing chips and/or assemblies, such as numerous multi-core CPUs. The memory 130 includes both volatile memory, e.g., Random Access Memory (RAM), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a data cache 136, a deduplication ("dedupe") manager 132, a deduplication database 150, a mapping layer 160, a virtualization layer 170, and a physical layer 180. The dedupe manager 132 is configured to manage deduplication activities. The data cache 136 may be realized in volatile memory (e.g., RAM) and is configured to store temporarily incoming data arriving from hosts 110. The data cache 136 may also store recently-written and/or read data blocks, to support deduplication. In an example, the data cache 136 defines incoming data 138 from hosts 110 in the form of blocks (such as block 140), where each block is composed of a sequence of sub-blocks (e.g., sub-blocks 140-0 through 140-7). As is known, a "block" is a unit of storage in a data storage system, which generally corresponds to the smallest unit of storage space that can be allocated. Block sizes vary from one storage system to the next, with typical sizes being 4 kB (kilobytes) or 8 kB, for example. In the particular arrangement shown, there are eight sub-blocks per block, and the sub-blocks are contiguous and uniform in size. For example, if the block size is 4 kB, each sub-block would be 512 B, which corresponds to one sector.

The dedupe database 150 is configured to store digests of sub-blocks along with associated information. For example, the dedupe database 150 stores, for each of multiple sub-blocks, a digest "D" of that sub-block and a reference ("Ref") to a location, in the data storage system 116, of a data block that contained the respective sub-block when the database entry was made. The SP 120 computes each digest as a hash of the respective sub-block's contents. Thus, different sub-blocks produce different digests, with rare hash collisions being possible. The reference Ref may take various forms. For example, Ref may point to a memory location in the data cache 136 where the data block is temporarily being held. Alternatively, Ref may point to metadata (e.g., a block virtualization structure) that maps to the data block, such that a persisted version of the data block may be obtained by following the reference to the pointed-to metadata. In some examples, the reference points directly to the data block, e.g., in the physical layer 180. An entry in the dedupe database 150 may further include a sub-block position, "Pos," which indicates a position of the sub-block for that entry in the referenced data block. For example, if the sub-block for a database entry was the first sub-block in the data block that contained it, then the position Pos might be 0. If the sub-block was the last sub-block in the data block, then the position Pos might be 7. In some examples, entries in the dedupe database 150 are created only for first and last sub-blocks of their parent data blocks, such that there are only two possibilities and Pos may be represented with a single bit. In some examples, sub-block position may be tracked using a separate bitmap. The bitmap may be arranged by sub-block and may provide a single bit for each sub-block, to indicate whether the respective sub-block is in the first position or in the last position.

The dedupe database 150 may operate as a memory-resident cache. The cache may utilize an LRU (least-recently used) eviction policy. In some examples, when evicting an entry from the dedupe database 150, the SP 120 also evicts the data block referenced by that entry in the data cache 136. In some cases, the dedupe database 150 is backed by persistent storage, with portions read into volatile memory as needed for fast access.

The mapping layer 160 includes metadata for mapping blocks of data objects, such as LUNs (Logical UNits), file systems, virtual machine disks, and/or the like, which may be managed by a separate namespace layer (not shown). The mapping layer 160 maps each data object to a corresponding set of block virtualization structures ("BVSs") in the virtualization layer 170. In some examples, one BVS is provided for each addressable data block in the storage system. The mapping layer 160 includes indirect blocks ("IBs") 162. Each IB 162 is a block that contains an array of block pointers, such as 1024 block pointers. In an example, IBs 162 are arranged in a tree, or in multiple trees, in which block pointers in parent IBs point to child IBs and thus multiply the total number of BVSs (and therefore data blocks) that can be addressed.

In the virtualization layer 170, the BVSs enable the data storage system 116 to deduplicate physical data blocks and to relocate physical data blocks without having to update block pointers in the mapping layer 160. Block pointer updates would be a very burdensome task, given that block pointers tend to be much more numerous and widely dispersed than are BVSs.

The physical layer 180 manages the physical data blocks of the data storage system 116. For example, the physical layer 180 is denominated in data blocks of uniform size, such as 4 kB, 8 kB, or the like. Each data block is uniquely addressable.

The physical layer 180 is configured to store host data as storage extents in the data blocks. The extents may hold compressed data or uncompressed data. Some extents may be smaller than a block, e.g., if the data are compressed and/or if only a portion of a block's data are uniquely stored. One should appreciate that the physical layer 180 is itself a logical structure and that the bits of data are actually stored in devices of the storage 190. The data storage system 116 may include additional layers, which are not shown, such as a RAID (Redundant Array of Independent (or Inexpensive) Disks) layer, additional mapping layers, and the like. The depicted arrangement is intended merely to be illustrative.

In example operation, the hosts 110 issue I/O requests 112 to the data storage system 116. The SP 120 receives the I/O requests 112 at the communication interfaces 122 and initiates further processing. For example, the SP 120 receives sets of incoming data 138 being written by hosts 110 and renders the data in block-sized increments of memory, referred to herein simply as "blocks." The data as received from the hosts is not necessarily block-denominated and may arrive in I/O's of any size. Nevertheless, the data cache 136 may store the arriving data as blocks, which the data cache 136 may realize in buffer caches, for example. The size of the buffer caches is preferably configured to match the block size of the data storage system 116.

To support sub-block data deduplication, the SP 120 defines multiple sub-blocks for the defined blocks. For example, the SP 120 renders block 140 as sub-blocks 140-0 through 140-7, which are contiguous and uniformly sized. The inventors have recognized that a sub-block size of 512 B (one sector) is particularly well-suited for sub-block deduplication, as many host applications use the sector as a standard size for performing writes. Although host applications may shift data when writing to the data storage system 116, such shifts tend to appear in full-sector increments. Performing deduplication at per-sector granularity thus catches many shifted sectors that conventional, block-based deduplication would miss. Setting the sub-block size to something different from a sector is not excluded from processing described herein.

With the sub-blocks 140-0 through 140-7 defined, a deduplication attempt begins by attempting to match one or more the sub-blocks to an entry in the dedupe database 150. For example, the dedupe manager 132 receives a candidate sub-block 140C of the candidate block 140 and generates a digest of the candidate sub-block 140C, e.g., by applying a hash function to the contents of sub-block 140C. The dedupe manager 132 then searches the dedupe database 150 for a digest D that matches the computed digest of sub-block 140C. In a non-limiting example, the dedupe database 150 is constructed as a key-value store, where the digest D forms the key and the reference Ref and position Pos form the value. In such cases, searching for a matching entry in the dedupe database 150 merely entails looking up the value that corresponds to the digest which is applied as the key. If no match is found, the dedupe manager 132 may try a different sub-block of candidate block 140. If no match is found after attempting all sub-blocks 140-0 through 140-7, then the deduplication attempt fails for the candidate block 140. The SP 120 may then allocate a new storage extent from the physical layer 180 and store the contents of the candidate block 140 in the newly allocated extent.

If the dedupe manager 132 succeeds, however, in finding a matching entry 152 to the candidate sub-block 140C, then deduplication proceeds. In an example, the matching entry 152 is the entry in the dedupe database 150 for which the digest DT matches the computed digest of the candidate sub-block 140C. The digest DT itself was computed for an earlier processed sub-block, which we refer to as a "target sub-block," and was part of an earlier-processed data block, which we refer to as a "target block."

The dedupe manager 132 then follows the reference $Ref_T$ in the matching entry to obtain the target block, which may still reside in the data cache 136 or which may be fetched from storage 190 if it does not. Depending on implementation, the deduplication attempt may fail if there is a cache miss, as fetching the target block from disk may be too time-consuming to be warranted.

Assuming the target block is obtained, the dedupe manager 132 may proceed by confirming the match. For example, the dedupe manager 132 compares the candidate sub-block 140C with the target sub-block as read from the target block and tests whether the two are the same, e.g., by performing a data comparison. Note that the matching entry 152 indicates, via $Pos_T$, the position of the target sub-block in the target block. Thus, the comparison may proceed without having to scan the entire target block.

Assuming the match is confirmed, the dedupe manager 132 may identify the full extent of the match. For example, a match to the target sub-block may be part of a larger match between the candidate block 140 and the target block. Given the position, $Pos_T$, of the target sub-block in the target block, the dedupe manager 132 selects a direction in which to search for an extended match. For instance, if the target sub-block was the first block in the target block, then the search should proceed in the forward direction. But if the target sub-block was the last block in the target block, the search should proceed in the reverse direction. The dedupe manager 132 proceeds in the indicated direction, comparing bytes of the candidate block 140 with corresponding bytes of the target block, until an end of the candidate block 140 is reached or until the bytes of the two blocks no longer match. The dedupe manager 132 then identifies a boundary between a duplicate range of the candidate block, $R_{DUP}$, which is shared with a target range $R_{TARG}$ of the target block, and a unique range of the candidate block $R_{UQ}$, which is unique to the candidate block 140. Some block comparisons may yield two unique ranges, one before the duplicate range $R_{DUP}$ and one after.

Next, the dedupe manager 132 effects persistent storage of the candidate block 140, in a manner that efficiently accounts for both the duplicate range $R_{DUP}$ and the unique range $R_{UQ}$ (or unique ranges). In the example shown, the data storage system 116 has already stored the target block, along with metadata to support it. For example, SP 120 already configured a block pointer 164T in a leaf IB 162T in the mapping layer 160. The block pointer 164T is already configured to point to $BVS_T$ in the virtualization layer 170. $BVS_T$ in turn points to $Extent_T$, which stores the target block in the physical layer 180. Now, to support storage of the candidate block 140, the mapping layer 160 configures a block pointer 164C in leaf IB 162C. The block pointer 164C points to BVSc, which is made to point to two different locations. The first location is the address of $Extent_C$, which is designated for storing the unique range (or ranges), $R_{UQ}$, of the candidate block. The second location is the address of $BVS_T$, i.e., the BVS that points to the target block and contains the duplicate range, $R_{DUP}$. When pointing to $BVS_T$, the metadata in $BVS_C$ may specify the range $R_{TARG}$ of the target block that contains the shared data, such as by offset and length. The SP 120 may then store the unique range $R_{UQ}$ in $Extent_C$. The stored data may be compressed, if desired.

The described operations thus effect storage of the candidate block 140 while consuming only the amount of storage space required to support the unique range, $R_{UQ}$, which may be as small as a single sector, or smaller if compressed. Some additional metadata may be needed, but the additional metadata is small compared with the amount of storage space conserved. In a conventional, block-based deduplication scheme, the unique range $R_{UQ}$ would have precluded any match to a previous block, so the entire block would have to have been stored, which would have been up to eight times the amount of data that is stored in the current example.

One significant feature of the described technique is that it combines digest-based lookups of sub-blocks with data comparisons of data. In some circumstances, this arrangement allows data to be deduplicated at levels even smaller than the size of a sub-block. For example, when comparing the candidate block 140 with the target block, the dedupe manager 132 may operate with arbitrarily high precision. Thus, the dedupe manager 132 can identify boundaries between duplicate ranges and unique ranges with precision as high as a single byte.

Because the described technique uses data comparisons as part of its processing, the act of confirming that there are no hash collisions is a simple matter, as the target block and candidate block are already being compared. Some embodiments leverage this feature by using relatively small digests in the dedupe database 150, such as digests having fewer than 128 bits. Although long digests can reduce the risk of hash collisions to nearly zero, they are complex to compute and can place high burdens on processor cores. As the disclosed technique compares the blocks as part of its regular processing, the technique is tolerant to hash collisions. Should a hash collision (false positive match) occur, the collision will be detected by data comparison and treated as a non-match. In such cases, the dedupe manager 132 can simply try again or move on to the next sub-block of the candidate block, attempting to match that one.

Also, one of ordinary skill in the art will appreciate that sub-block deduplication is also capable of matching entire blocks. For instance, if a data comparison of a candidate block to a target block results in a duplicate range $R_{DUP}$ the size of the entire block, with a unique range $R_{UQ}$ of zero size, then the entire block is matched and no unique range needs to be stored.

One might observe that sub-block duplication generally requires a greater number of digest lookups than does block-based deduplication. However, the use of smaller digests can help to offset the increased number of lookups. Also, implementations may limit the cost of lookups where no match is found by using Bloom filters, for example.

Although data comparisons are the general rule, it can be avoided in some circumstances. For instance, if the candidate sub-block is in the first position of the candidate block (like sub-block 140-0), and the position indicator $Pos_T$ of the matching entry 152 indicates the last position in the target block, then the match cannot be extended as there is no possibility of there being additional shared content. The match would thus be limited to the matching sub-block, and a data comparison is avoided.

The dedupe manager 132 may also play a role in loading the dedupe database 150 with new content. For instance, as the data cache 136 receives new host data and defines new blocks, the dedupe manager 132 may access those blocks and create new database entries for one or more of their sub-blocks. Creating new entries for all sub-blocks of each newly defined block is certainly an option, but we have recognized that it is generally sufficient to create entries for only the first and the last sub-blocks, e.g., 140-0 and 140-7. In the example shown, the dedupe manager 132 has created new database entries for sub-blocks 140-0 and 140-7. Each entry includes a digest hash of the respective sub-block ($D_{C0}$ or $D_{C7}$), a position (0 or 7) of the respective sub-block in the candidate block 140, and a reference Refc to the candidate block 140, which may be a pointer to the buffer cache that stores the candidate block 140 in the data cache 136.

A rationale behind limiting new database entries to first and last sub-blocks is that data shifts (by sector increments) may be common, but data inserts may be expected to be relatively rare. Recording entries for the first and last sub-blocks ensures that shifted data will produce at least one sub-block match. In some cases, new sub-block entries are avoided for sub-blocks that are already recorded in entries of the dedupe database 150.

Figure 2A:
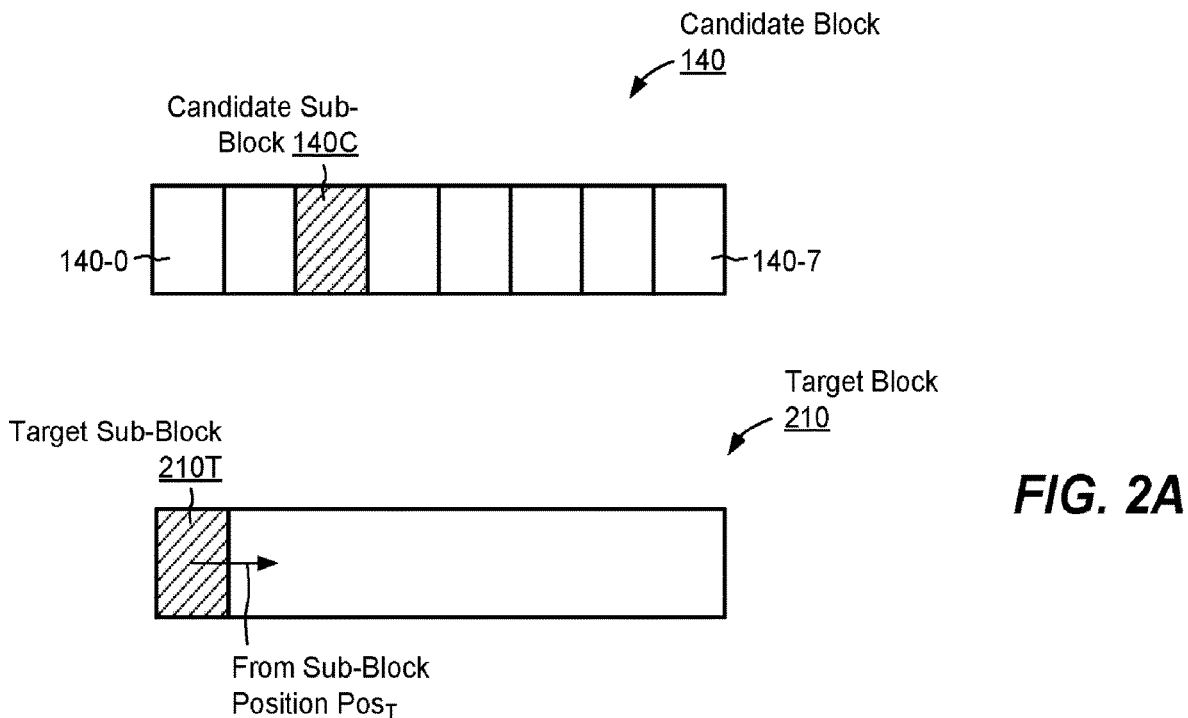
FIGS. 2A and 2B are diagrams that show an example sequence for identifying a duplicate range and a unique range of a candidate block when a candidate sub-block has matched to a target sub-block that occupies a first position of a target block.
Figure 2B:
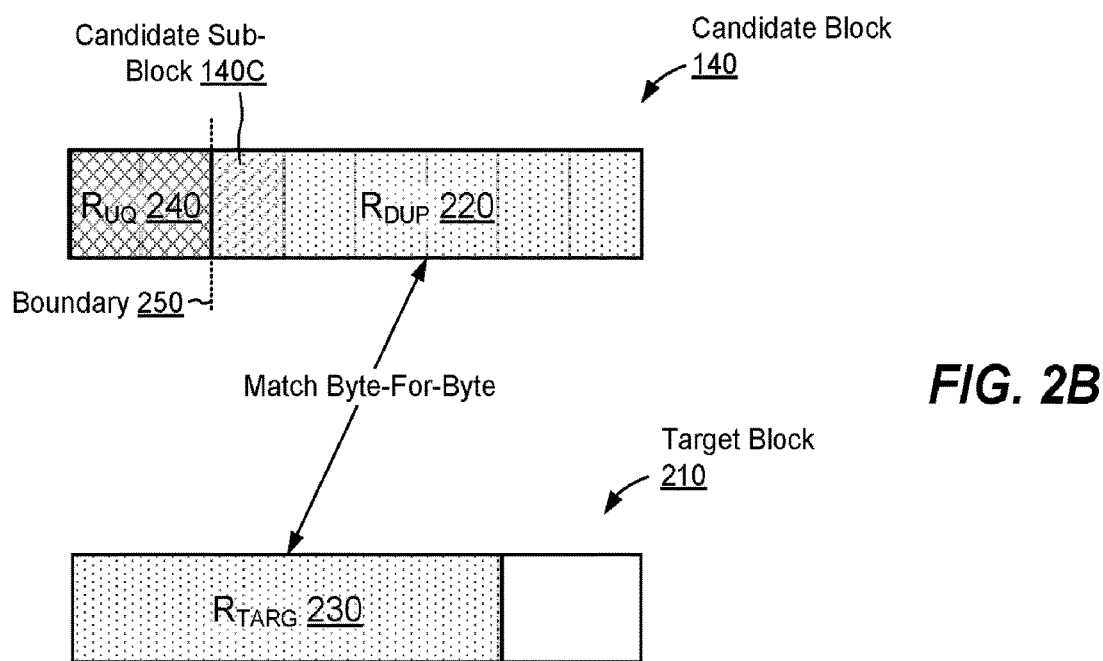

Referring to FIGS. 2A and 2B, shown is an example sequence for deduplicating a portion of candidate block 140 when candidate sub-block 140C has been matched to a target sub-block 210T in a first position of a target block 210. As shown in FIG. 2A, the value of $Pos_T$ in the matching entry 152 has identified the target sub-block 210T as being in the first position of the target block 210, which indicates a forward search direction through the candidate block 140.

The dedupe manager 132 proceeds to search in the forward direction through the candidate block, starting with the candidate sub-block 140C (or the forward end of it, e.g., if a hash collision has been ruled out). As the dedupe manager 132 advances through the candidate block 140, it advances correspondingly through the target block 210, comparing data of the candidate block 140 with data of the target block 210 at a level of granularity smaller than the size of a sub-block. For instance, comparisons may proceed in 16-byte chunks, in 8-byte chunks, in 1-byte chunks, or in any-sized chunks are best suited to the implementation.

At some point, the dedupe manager 132 either detects a mismatch or reaches the forward end of the candidate block 140. In this example, no mismatch is detected and, as shown in FIG. 2B, the dedupe manager 132 identifies a duplicate range $R_{DUP}$ 220 in the candidate block 140 and a corresponding target range $R_{TARG}$ 230 in the target block 210. These ranges match byte-for-byte and are exact duplicates of each other. The dedupe manager 132 also identifies a unique range, $R_{UQ}$ 240, of the candidate block, which does not correspond to any content in the target block 210. A boundary 250 may be identified between the duplicate range $R_{DUP}$ 220 and the unique range $R_{UQ}$ 240. In this case, the boundary 250 aligns with a sub-block boundary, i.e., between sub-blocks 140-1 and 140-2. The dedupe manager 132 then proceeds as already described, by arranging mapping metadata to effect storage of the duplicate range $R_{DUP}$ (by reference to the range $R_{TARG}$ in the target block) and by directing storage of the unique range $R_{UQ}$ in a storage extent in the physical layer 180. This example thus avoids redundant storage of $R_{DUP}$ and saves three quarters of a block.

Figure 3A:
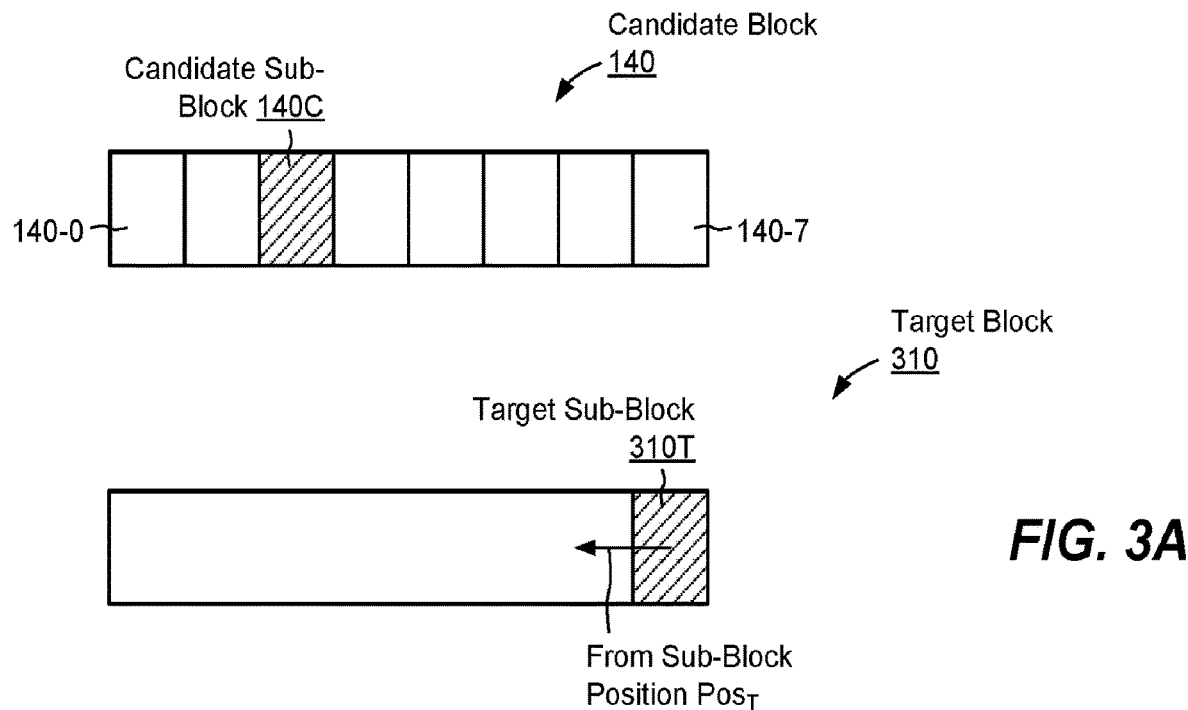
FIGS. 3A and 3B are diagrams that show an example sequence for identifying a duplicate range and a unique range of a candidate block when a candidate sub-block has matched to a target sub-block that occupies a last position of a target block.
Figure 3B:
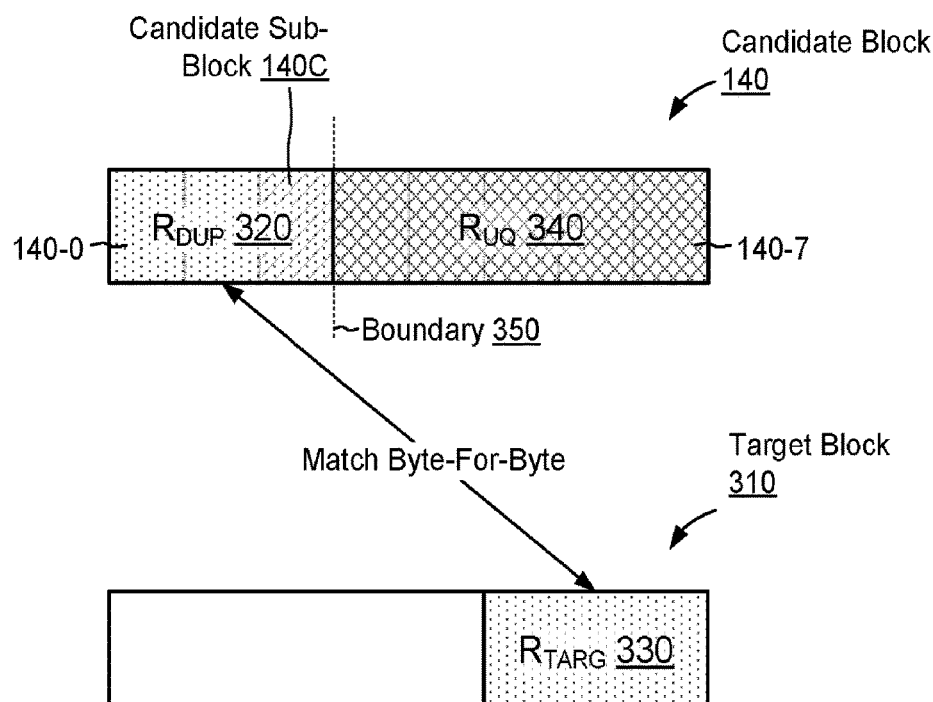

Referring to FIGS. 3A and 3B, shown is an example sequence for deduplicating a portion of candidate block 140 when candidate sub-block 140C has been matched to a target sub-block 310T in a last position of a target block 310. As shown in FIG. 3A, the value of $Pos_T$ in the matching entry 152 has identified the target sub-block 310T as being in the last position of the target block 310, which indicates a reverse search direction through the candidate block 140. The dedupe manager 132 proceeds to search in the reverse direction through the candidate block, starting with the candidate sub-block 140C (or the back end of it). As the dedupe manager 132 retracts through the candidate block 140, it retracts correspondingly through the target block 310, comparing data of the candidate block 140 with data of the target block 310 at fine granularity. In this example, no mismatch is detected and, as shown in FIG. 3B, the dedupe manager 132 identifies a duplicate range $R_{DUP}$ 320 in the candidate block 140 and a corresponding target range $R_{TARG}$ 330 in the target block 310. The dedupe manager 132 also identifies a unique range, $R_{UQ}$ 340, of the candidate block 140, which does not correspond to any content in the target block 310. A boundary 350 may also be identified between the duplicate range $R_{DUP}$ 320 and the unique range $R_{UQ}$ 340. In this case, the boundary 350 aligns with a sub-block boundary, i.e., between sub-blocks 140-2 and 140-3. The process then proceeds as described above, by arranging mapping metadata to effect storage of the duplicate range $R_{DUP}$ and by directing storage of the unique range $R_{UQ}$ in the physical layer 180. This example saves three eighths of a block.

Figure 4A:
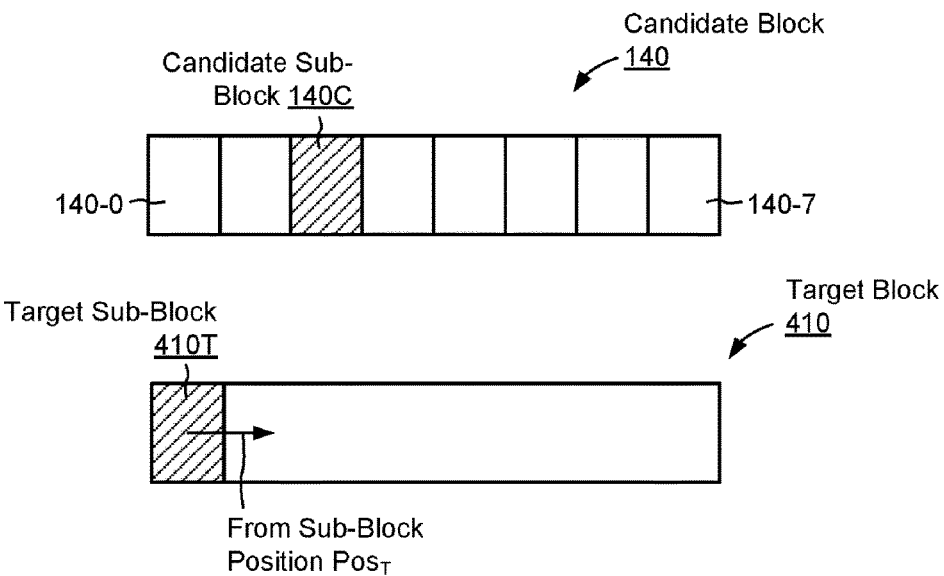
FIGS. 4A, 4B and 4C are diagrams that show an example sequence for identifying a duplicate range and two discontiguous unique ranges of a candidate block when the duplicate range does not extend all the way to an end of the candidate block.
Figure 4B:
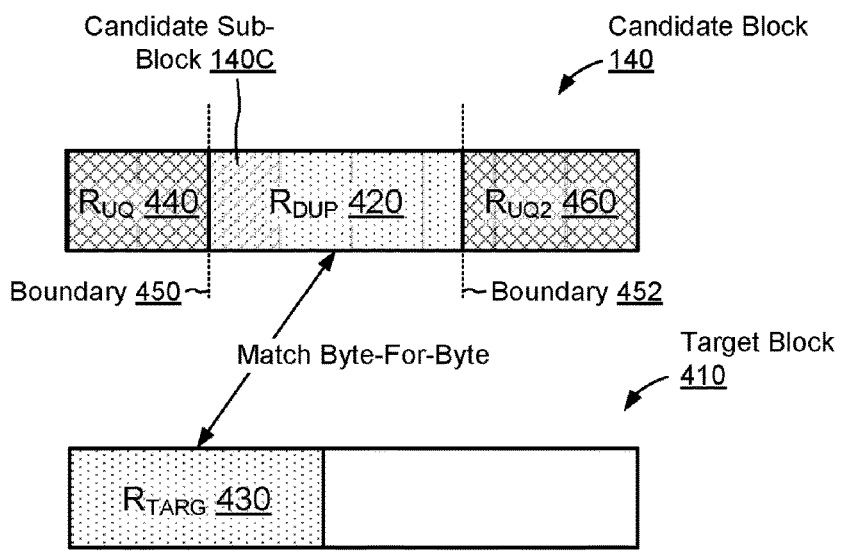

Referring to FIGS. 4A and 4B, shown is a slightly more complex example. As in FIG. 2A, the candidate sub-block 140C has been matched to a target sub-block 410T in a first position of a target block 410. But here, the comparison between candidate block 140 and target block 410 has yielded a mismatch. Rather than extending all the way to the end of the candidate block 140, as in FIG. 2B, the duplicate range $R_{DUP}$ 420 ends at boundary 452. Beyond this point, the contents of the two blocks diverge. The boundary 452 does not align with any boundary between sub-blocks but can rather be found at some byte location relative to the fifth sub-block, 140-5.

As shown in FIG. 4B, three distinct ranges are formed: a duplicate range $R_{DUP}$ 420; a first unique range $R_{UQ}$ 440; and a second unique range $R_{UQ2}$ 460. Boundary 450 separates $R_{DUP}$ from $R_{UQ}$, and boundary 452 separates $R_{DUP}$ from $R_{UQ2}$. Range $R_{DUP}$ 420 matches target range $R_{TARG}$ 430 byte-for-byte.

Figure 4C:
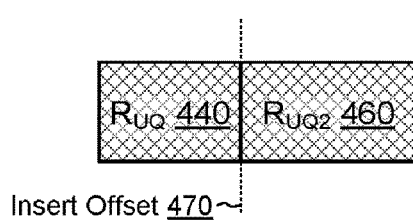

As shown in FIG. 4C dedupe manager 132 may combine the two unique ranges, $R_{uQ}$ 440 and $R_{uQ2}$ 460, by placing them adjacently, while specifying an insert offset 470 to identify their boundary. The insert offset range 470 is so named as it identifies the location at which the contents of $R_{DUP}$ 420 is to be inserted when the candidate block 140 is reconstructed, e.g., when a later read request arrives. In an example, the SP 120 stores the insert offset 470 in mapping metadata for the candidate block 140. Although not addressed previously, the examples in FIGS. 2A/2B and 3A/3B may also involve specifying an insert offset, which in those examples would indicate whether the duplicate range $R_{DUP}$ is to be inserted before or after the unique range, $R_{UQ}$, when reconstructing the respective candidate blocks.

Figure 5A:
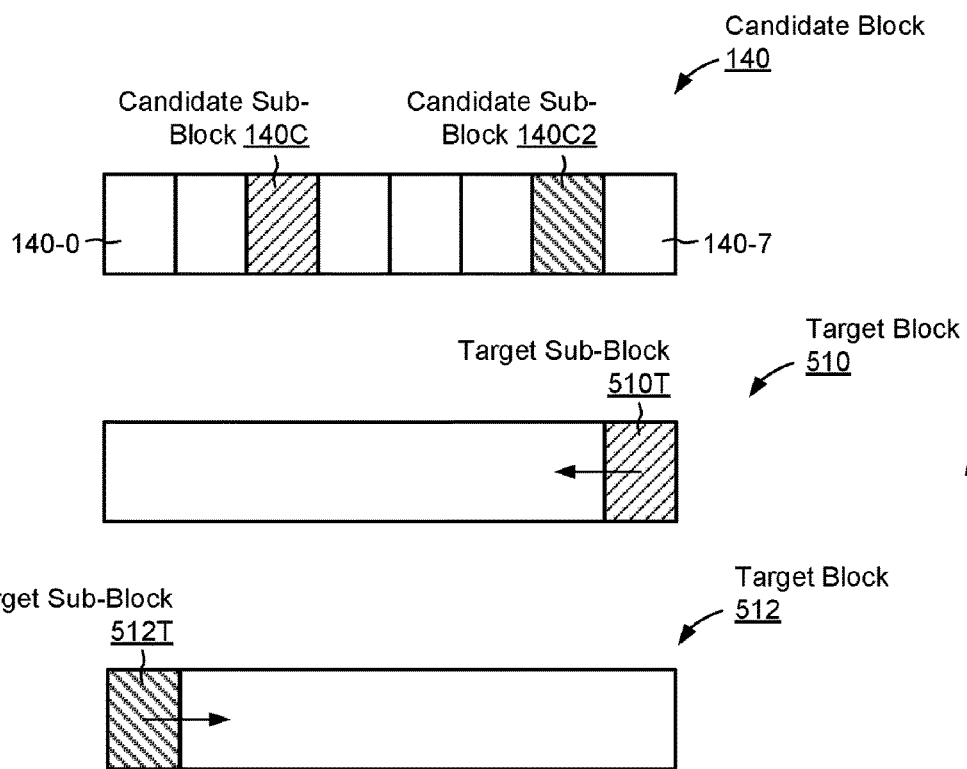
FIGS. 5A and 5B are diagrams that show an example sequence for identifying two duplicate ranges and a unique range of a candidate block when two candidate sub-blocks have matched to two different target blocks.
Figure 5B:
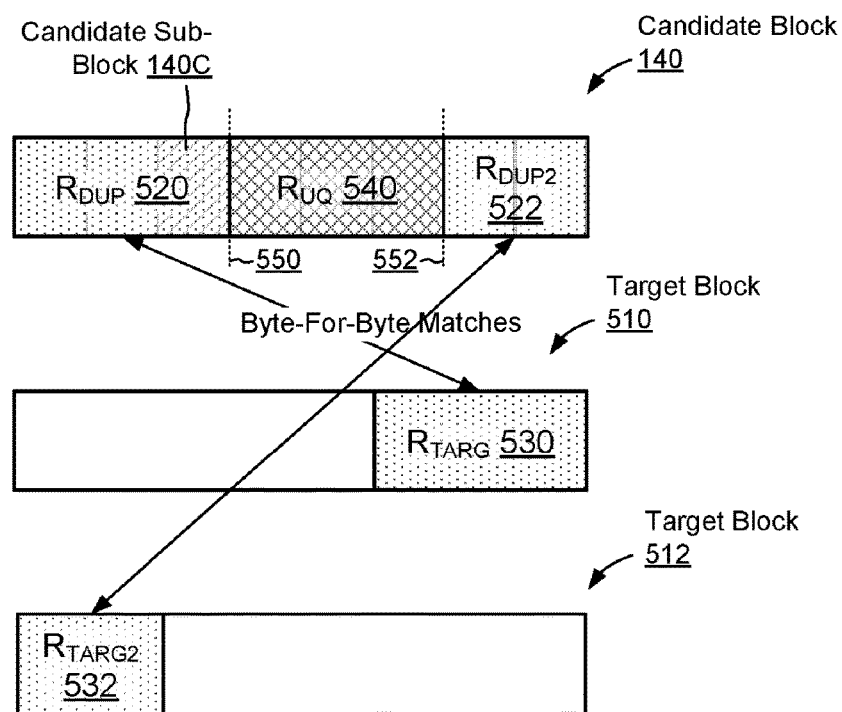

Referring to FIGS. 5A and 5B, shown is a slightly more complex example still. As shown in FIG. 5A, two candidate sub-blocks, 140C and 140C2, of the candidate block 140 have produced respective matches to two different entries in the digest database 150. In this example, the different matches reference different target blocks 510 and 512. In particular, candidate sub-block 140C has matched target sub-block 510T, which occupies the last position in target block 510, and candidate sub-block 140C2 has matched target sub-block 512T, which occupies the first position of target block 512. As shown in FIG. 5B, the dedupe manager 132 has identified two duplicate ranges, $R_{DUP}$ 520 and $R_{DUP2}$ 522, with a single unique range $R_{UQ}$ 540 separating the two duplicate ranges. Duplicate range $R_{DUP}$ 520 matches, byte-for-byte, target range $R_{TARG}$ 530 in target block 510, and duplicate range $R_{DUP2}$ 522 matches, byte-for-byte, target range $R_{TARG}$ 532 in target block 512. Boundaries 550 and 552 separate the ranges of the candidate block 140 in the manner shown. As usual, the process stores the unique range $R_{UQ}$ 540 in a storage extent in the physical layer 180.

The presence of two duplicate ranges may necessitate the creation of additional metadata, as BVSc of the candidate block 140 must point to two different target ranges 530 and 532 in two different target blocks 510 and 512. Two insert offsets may be specified, as well, to indicate where each duplicate range is to be inserted relative to the unique range.

Figure 6A:
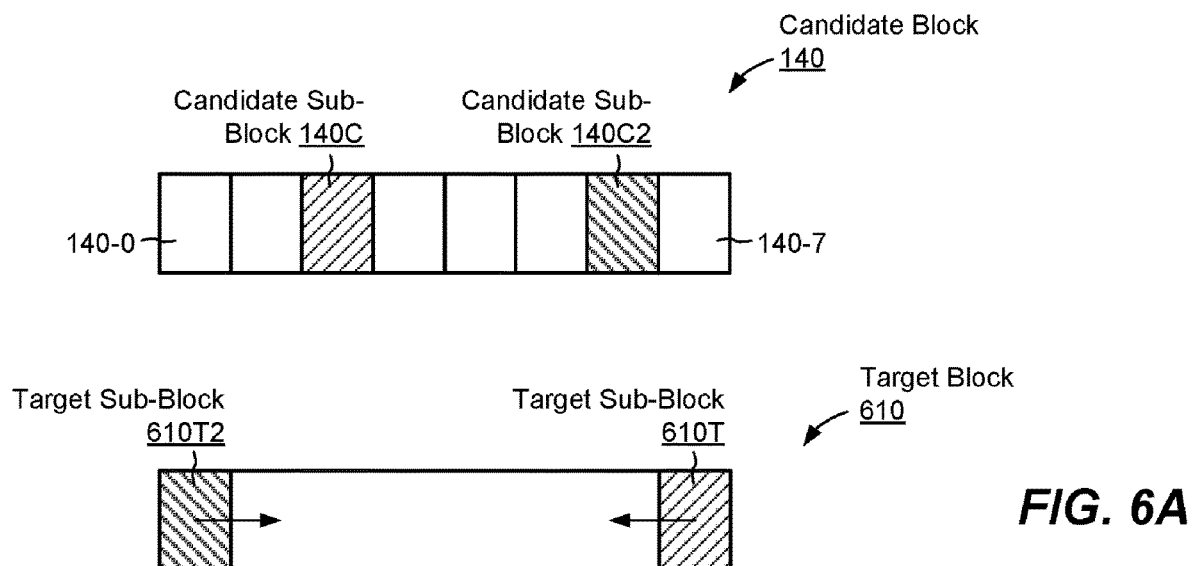
FIGS. 6A and 6B are diagrams that show an example sequence for identifying two duplicate ranges and a unique range of a candidate block when two candidate sub-blocks have matched to two distinct ranges of a single target block.
Figure 6B:
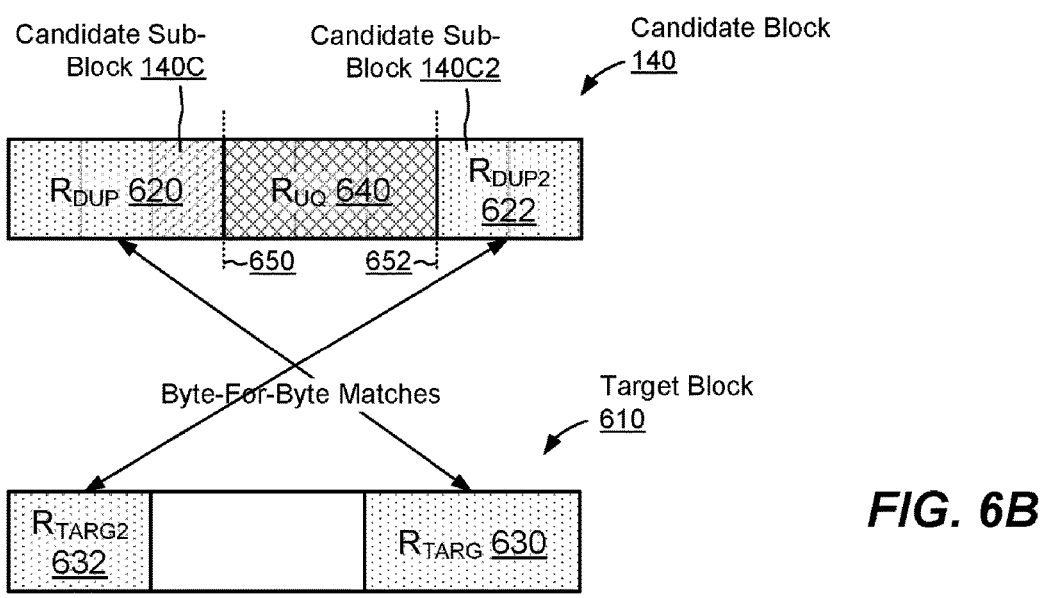

Referring to FIGS. 6A and 6B, shown is yet another example. This example is similar to the one shown in FIGS. 5A and 5B, but here two target sub-blocks 610T and 610T2 are found within the same target block 610, rather than in two different target blocks. Candidate sub-block 140C has matched to target sub-block 610T, and candidate sub-block 140C2 has matched to target sub-block 610T2. As shown in FIG. 6B, two duplicate ranges are formed, $R_{DUP}$ 620 and $R_{DUP2}$ 622, which match, respectively, with target ranges $R_{TARG}$ 630 and $R_{TARG2}$ 632. A single unique range $R_{UQ}$ 640 is formed in the candidate block 140 between the two duplicate ranges, with boundaries 650 and 652 identified as shown. Unique range $R_{UQ}$ 640 may be stored in the usual way. BVSc of the candidate block 140 must now point to two different target ranges 630 and 632 in the target block 610, which may require two different insert offsets.

Figure 7:
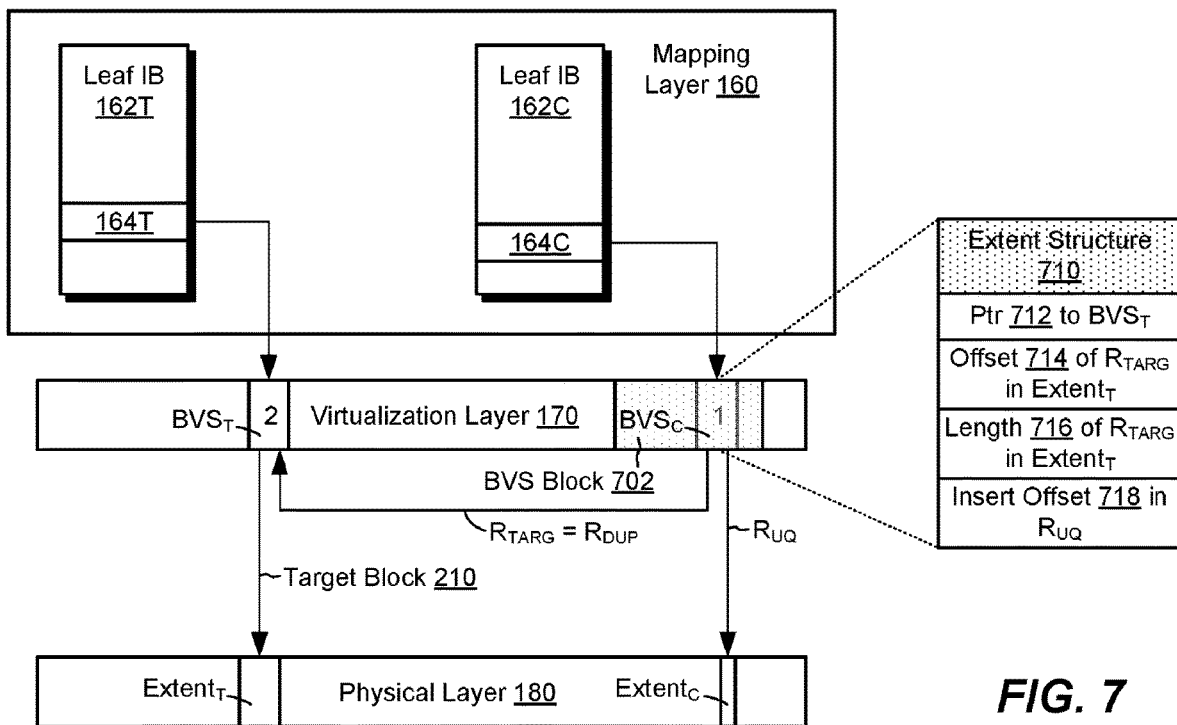
FIG. 7 is a block diagram of an example arrangement where mapping metadata is provided in a virtualization layer for supporting deduplication at sub-block granularity.

FIG. 7 shows the example metadata structures of FIG. 1 in additional detail. Here, it is seen that BVSc, which is provided for mapping the candidate block 140, is located within a BVS block 702. In some examples, BVS block 702 may include a large number of BVSs. Each BVS has a reference count, which tracks the number of block pointers that point to the respective BVS. For instance, BVSc has a reference count of one, because only one block pointer, pointer 164C in leaf IB 162C, points to it. BVST, which is provided for mapping the target block 210, has a reference count of two, reflecting the fact that both block pointer 164T in leaf IB 162T and a pointer in BVSc point to it.

As shown to the right of FIG. 7, BVSc stores an extent structure 710. The extent structure 710 is metadata that references a range of data in the current block within the data of another block. For example, BVSc supports mapping for a particular logical address of a particular data object hosted by the data storage system 116, and BVSc resolves that logical address into a first pointer to the unique range $R_{UQ}$ and a second pointer to the duplicate range $R_{DUP}$. Here, the first pointer of BVSc points to $Extent_C$ and the second pointer, which is provided within the extent structure 710, points to the target range $R_{TARG}$ of the target block 210. Example metadata elements of the extent structure 710 include the following:

Pointer 712. An address of BVST, the BVS of the target block where the duplicate range resides in the virtualization layer 170.

Offset 714. Offset of the target range $R_{TARG}$ in $Extent_T$. Used for locating the starting location of $R_{TARG}$, which matches $R_{DUP}$.

Length 716. The length of the target range $R_{TARG}$ in $Extent_T$. The offset 714 and length 716 together fully identify the target range $R_{TARG}$ within $Extent_T$, which is itself fully identified by the pointer 712.

Insert Offset 718. An offset relative to the unique range $R_{UQ}$ in $Extent_C$ where the contents of the duplicate range $R_{DUP}$ are to be inserted when reconstituting the candidate block 140.

One should appreciate that an extent structure 710 is required only in cases where some of the contents that would normally be contained in an extent pointed to by a BVS have been deduplicated, such that those contents reside in a different physical extent from the one pointed to by that BVS. Thus, only some BVSs will use extent structures 710, whereas others do not. In addition, some BVSs may employ multiple extent structures 710. The examples presented in FIGS. 5A/5B and 6A/6B would each require two extent structures 710, one for identifying each of the two duplicate ranges presented in each example. Further, one should appreciate that the placement of extent structures 710 in the mapping metadata may be varied.

Figure 8:
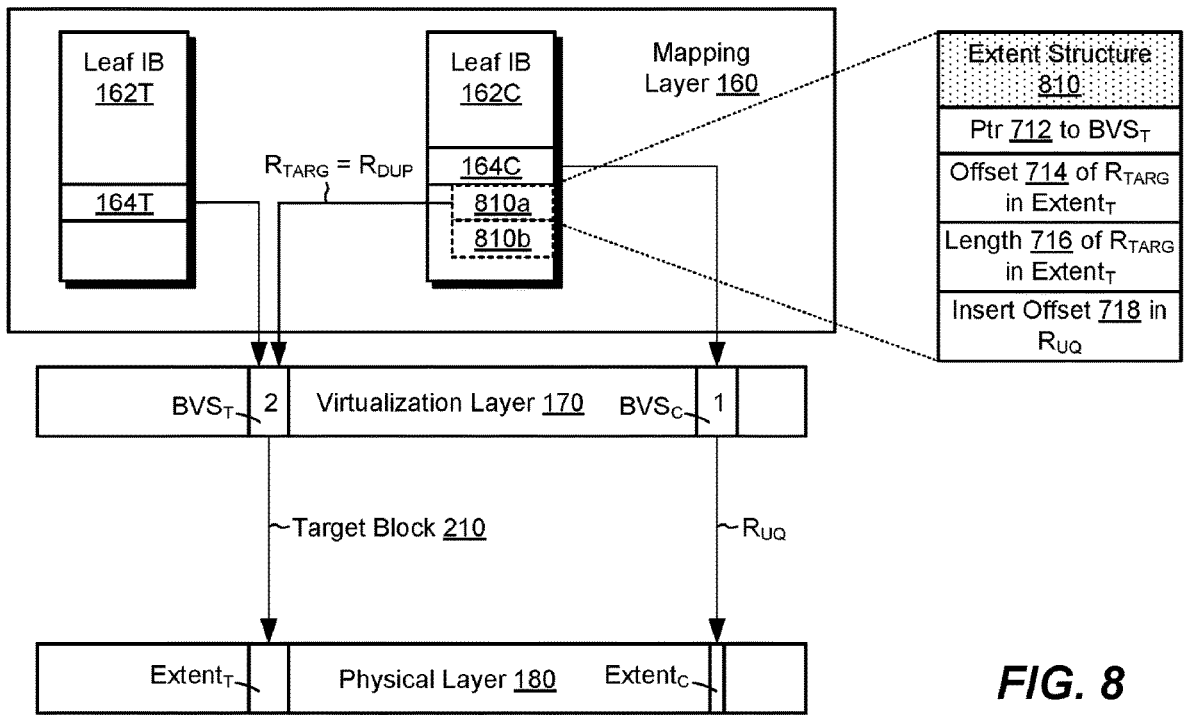
FIG. 8 is a block diagram of an example arrangement where mapping metadata is provided in a mapping layer for supporting deduplication at sub-block granularity.

FIG. 8 shows another example of an extent structure. Rather than being located in BVSc, as was the case in FIG. 7, the extent structure 810 is instead located in leaf IB 162C. Placing the extent structure 810 in the leaf IB has the inherent advantage of avoiding multiple hops. In FIG. 7, for example, the SP 120 would have to access BVSc, read its extent structure 710, and then access BVST. Those accesses would have to be performed in order, one after the other. By contrast, locating the extent structure 810 in the leaf IB, as shown in FIG. 8, allows the SP 120 to access both BVSc and $BVS_T$ in parallel, promoting faster processing.

Between zero and two extent structures are needed for each leaf-IE block pointer, with two extent structures shown here as structures 810a and 810b. As the leaf IB is itself a block, which has limited space, it may be preferable in some examples to compress the contents of the leaf IB when many extent structures 810 are needed. Each leaf IB 162 includes a header and an array of block pointers. In an example, the header is marked with a label that identifies the pointers as compressed or uncompressed, and the array of block pointers (but not the header) is compressed, along with the associated extent structures 810. In this manner, ample space may be made available for any required number of extent structures 810.

Figure 9:
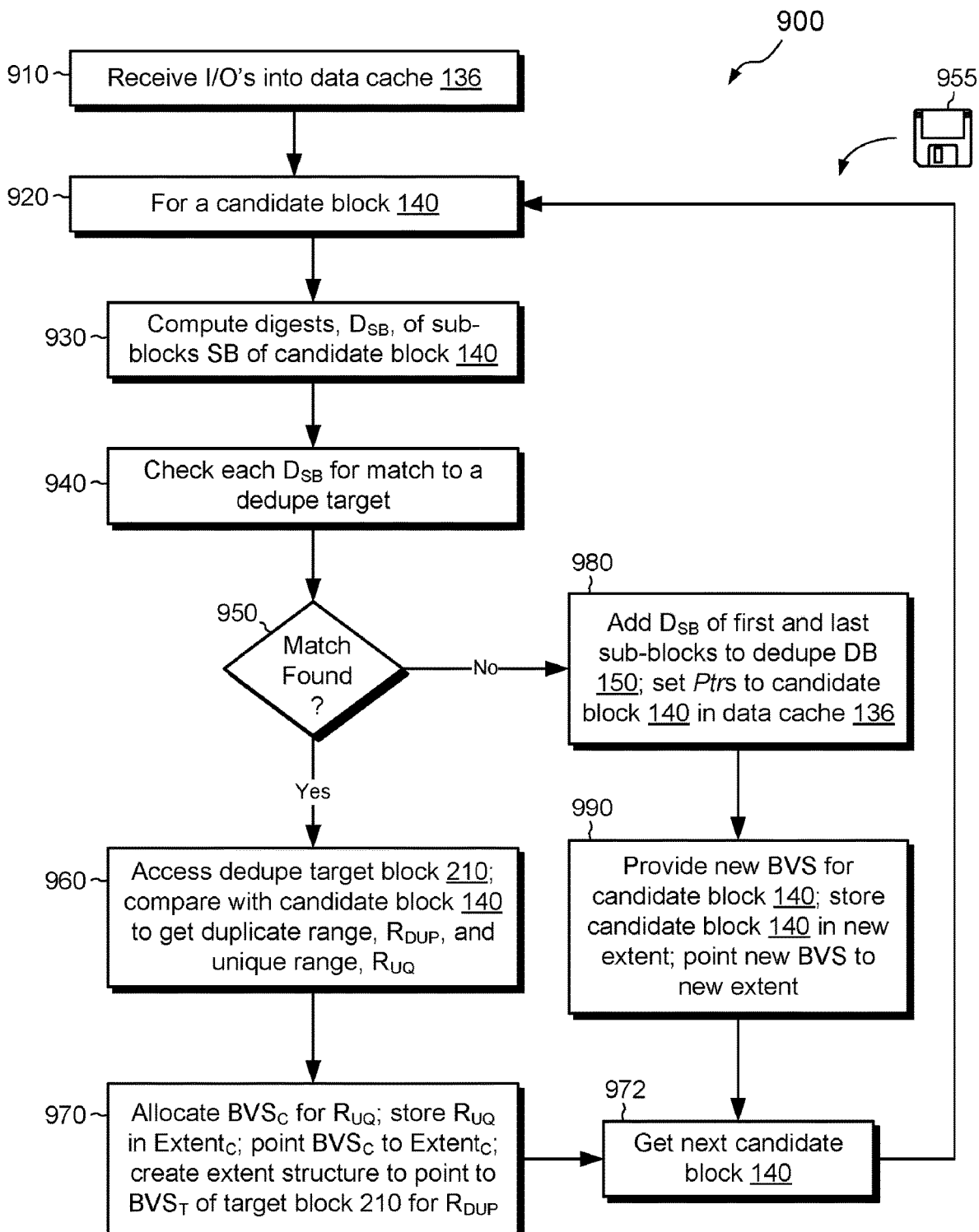
FIG. 9 is a flowchart that shows an example method of processing I/O write requests in the environment of FIG. 1.
Figure 10:
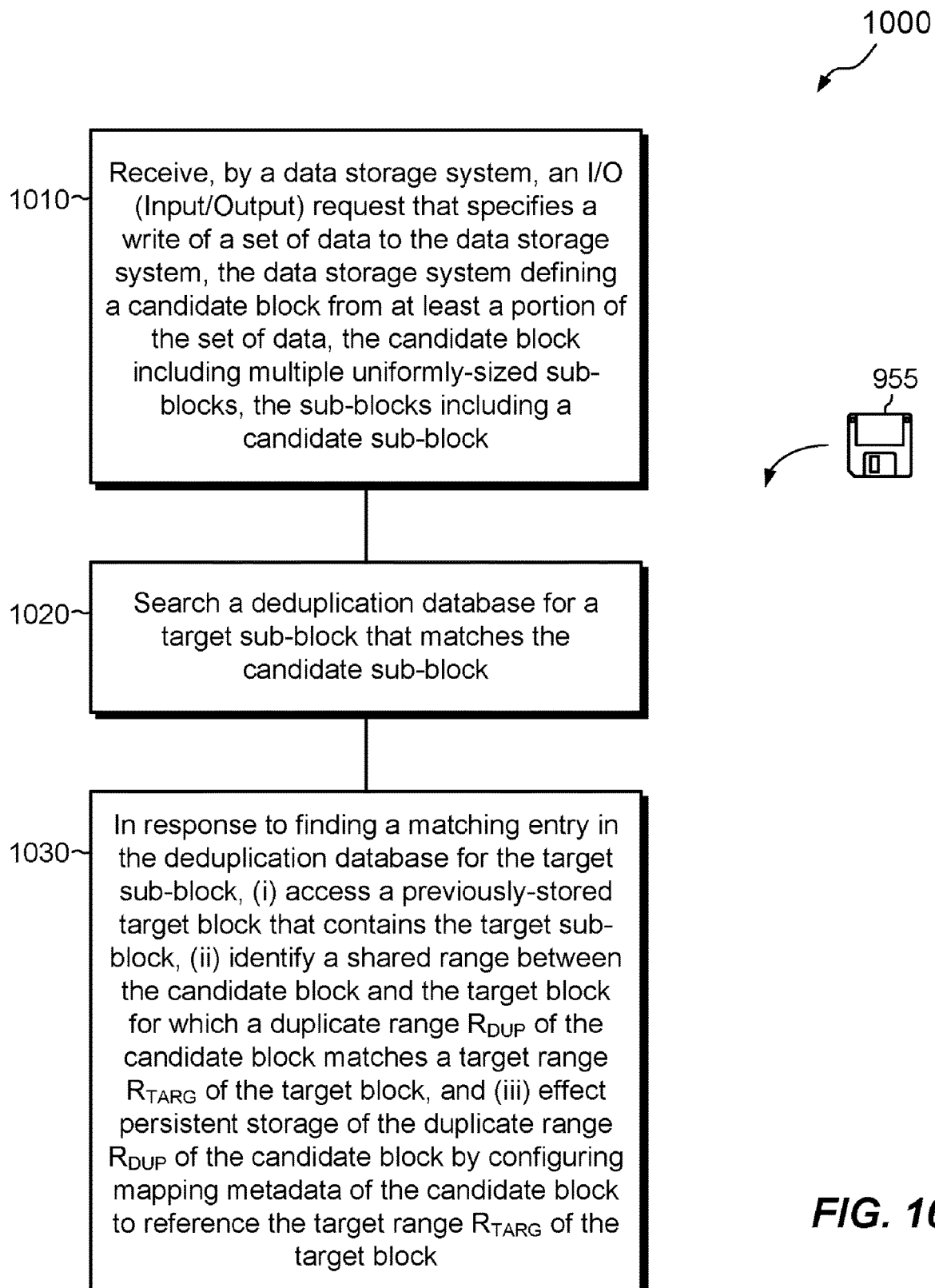
FIG. 10 is a flowchart that shows an example method of performing data deduplication in the environment of FIG. 1.

FIGS. 9 and 10 show flowcharts of processing steps or methods 900 and 1000 that may be carried out in connection with the environment 100. The methods 900 and 1000 are typically performed, for example, by the software constructs described in connection with FIG. 1, which reside in the memory 130 of the storage processor 120 and are run by the set of processors 124. The various acts of methods 900 and 1000 may be ordered in any suitable way. Accordingly, embodiments may be constructed in which acts are performed in orders different from those illustrated, which may include performing some acts simultaneously.

FIG. 9 shows example method 900 of performing inline deduplication at sub-block granularity. At 910, the SP 120 receives sets of data specified in write I/O requests 112 into the data cache 136. The data cache 136 stores the data in block-size buffer caches (blocks). Each such block includes multiple sub-blocks such as sub-blocks 140-0 to 140-7.

At 920, the dedupe manager 132 obtains a candidate block 140 from the data cache 136 and performs various acts relating to deduplication of the candidate block 140. For example, at 930, the dedupe manager 132 computes digests of at least one, but preferably all, sub-blocks 140-1 to 140-7 of the candidate block 140. At 940, the dedupe manager 132 searches the dedupe database 150 for each computed digest. At 950, if a match is found, operation proceeds to 960, whereupon the dedupe manager 132 accesses the target block 210 (or any of the other target blocks described above), by following the reference $Ref_T$ in the matching entry 152. The dedupe manager 132 then compares the candidate block 140 with the target block 210 and identifies the duplicate range $R_{DUP}$ of the candidate block 140, which contains the same data as the corresponding target range $R_{TARG}$ of the target block 210. The dedupe manager 132 also identifies a unique range $R_{UQ}$ of the candidate block 140.

With the duplicate range $R_{DUP}$ and the unique range $R_{UQ}$ identified, operation proceeds to 970, whereupon the SP 120 allocates BVSc for the candidate block 140, stores $R_{UQ}$ in $Extent_C$, and points BVSc to $R_{UQ}$. The SP 120 also effects storage of $R_{DUP}$ by reference, by creating an extent structure 710 (or 810) that points to range $R_{TARG}$ of the target block 210, e.g., by pointing to $BVS_T$ (via pointer 712), specifying the offset 714 and length 716 of $R_{TARG}$ in $Extent_T$, and specifying an insert offset 718 that identifies where $R_{DUP}$ is to be inserted relative to $R_{UQ}$ when reconstructing the candidate block 140. If two distinct duplicate ranges are detected, two extent structures 710 (or 810) may be created. In this manner, the data storage system 116 accounts for and can later access all the data of the candidate block 140 without having to store the duplicate range $R_{DUP}$. At 972, a next candidate block 140 is obtained and the operation described in steps 920-970 is repeated for the new candidate block. Although candidate blocks may be processed serially, as shown, they may also be processed in parallel, e.g., with multiple threads processing respective candidate blocks simultaneously.

Returning to 950, if no match is found to any of the sub-blocks 140-1 to 140-7 of the candidate block 140, operation proceeds to 980, whereupon the dedupe manager 132 creates new entries in the dedupe database 150 for the first and last sub-blocks of the candidate block 140. Creating new entries includes establishing pointers Ptr in each new entry to the candidate block 140 in the data cache 136.

At 990, the SP 120 stores the candidate block 140, without performing deduplication, by providing a new BVS for the candidate block 140, storing the candidate block 140 in a new storage extent, and pointing the new BVS to the new storage extent. Data may be stored in compressed or uncompressed form.

Referring to FIG. 10, shown is a method 1000 of performing data deduplication and summarizes some of the improvements described above. At 1010, a data storage system 116 receives an I/O (Input/Output) request 112 that specifies a write of a set of data 138 to the data storage system. The data storage system 116 defines a candidate block 140 from at least a portion of the set of data 138. The candidate block includes multiple uniformly-sized sub-blocks, e.g., 140-0 to 140-7, and the sub-blocks include a candidate sub-block 140C.

At 1020, a deduplication database 150 is searched for a target sub-block that matches the candidate sub-block 140C. For example, the dedupe manager 132 computes a digest of the candidate sub-block 140C and searches the dedupe database 150 for a matching entry.

At 1030, in response to finding a matching entry 152 in the deduplication database 150 for the target sub-block (e.g., 210T, 310T, etc.), (i) accessing a previously-stored target block (e.g., 210, 310, etc.) that contains the target sub-block, (ii) identifying a shared range between the candidate block 140 and the target block for which a duplicate range $R_{DUP}$ of the candidate block matches a target range $R_{TARG}$ of the target block, and (iii) effecting persistent storage of the duplicate range $R_{DUP}$ of the candidate block 140 by configuring mapping metadata (e.g., 710, 810) of the candidate block 140 to reference the target range $R_{TARG}$ of the target block.

An improved technique has been described for performing data deduplication, which operates at the sub-block granularity by searching a deduplication database 150 for a match between a candidate sub-block 140C of a candidate block 140 and a target sub-block of a previously-stored target block. When a match is found, the technique identifies a duplicate range $R_{DUP}$ shared between the candidate block and the target block and effects persistent storage of the duplicate range $R_{DUP}$ by configuring mapping metadata of the candidate block 140 so that it points to the duplicate range $R_{TARG}$ in the target block.

Although techniques have been described for performing data deduplication inline with I/O requests 112 (e.g., also described in more detail in following paragraphs), similar techniques can be applied when performing deduplication in the background. Background deduplication can proceed substantially as described above, except that the dedupe manager 132 obtains candidate blocks 140 from persistent storage, rather than from incoming I/O requests 112. For example, SP 120 reads a data block from persistent storage, computes digests from sub-blocks of the data block, and searches the dedupe database 150 for a match to one or more of the sub-blocks. If the search reveals a match to a previously-stored target block, the SP 120 identifies a duplicate range $R_{DUP}$ and a unique range $R_{UQ}$ of the candidate block 140, effecting storage of the duplicate range $R_{DUP}$ by configuring metadata (e.g., an extent structure 710 or 810 in a BVS or IB) to reference the corresponding range $R_{TARG}$ in the target block. Also, the SP 120 replaces the storage extent that holds the previously-stored version of the candidate block 140 with a new storage extent that stores only the unique range $R_{UQ}$ of the candidate block 140. The new storage extent may be written in place of the original one, with the residual space being freed, or the unique range $R_{UQ}$ may be written to a newly allocated storage extent in the physical layer 180, with the entirety of the extent holding the original candidate block being freed.

Also, the above description has indicated that certain structures "reference" or "point to" other structures. One should appreciate that any such reference or pointing can be direct or indirect, meaning that intervening pointing structures can also be present. Further, although referenced or pointed-to structures may be identified hereinabove as "blocks," such blocks need not be persistently-stored versions. For example, such blocks may be cached versions of data blocks, or memory-resident structures that have not yet been stored on persistent storage devices.

Further, the extent structures 710 or 810 (or more generally the block level metadata) can be adapted to store additional metadata for tracking small differences between sub-blocks. For instance, a data comparison of a candidate block with a target block that extends beyond the initially-matching candidate and target sub-blocks (such as shown in FIG. 2B) may reveal small differences between adjacent sub-blocks (of candidate and target blocks) being compared, which sub-blocks are almost but not quite identical. Such differences may extend over only a small number of bytes, which could easily fit into available extra space in extent structures or other block level metadata. Thus, additional improvements may identify such minor differences (deltas) and store them in metadata along with a pointer to their locations in the block or sub-block. In this manner, the dedupe match can be extended to include the nearly-matching block or sub-block, which becomes part of the duplicate range $R_{DUP}$ and can thus be deduplicated. During a later read, the SP 120 can reconstruct the block in the usual way and then access the delta from the metadata and insert the delta in place of the duplicate data at the indicated location, thus restoring the difference. Such an embodiment may be useful where small differences in sub-blocks of different data blocks arise merely from timestamps, labels, or minor edits.

Consistent with discussion herein, the data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. The data path and control path each define two separate logical flow paths.

An embodiment of a data storage system in accordance with the techniques herein may perform different data processing operations or services on stored user data. For example, the data storage system may perform one or more data reduction operations, such as data deduplication and compression as discussed herein, as well as other types of operations or services. Generally, data deduplication and compression techniques are known in the art and any suitable such technique may be used in an embodiment in accordance with the techniques herein. In at least one embodiment, the compression technique may be a lossless compression technique such as an algorithm from the Lempel Ziv algorithm family (e.g., LZ77, LZ78, LZW, LZR, and the like). In at least one embodiment in accordance with the techniques herein, data deduplication processing performed may include digest or hash value computation using an algorithm such as based on the SHA-256 hashing algorithm known in the art. Data deduplication generally refers to removing redundant or duplicate data portions. Data deduplication techniques may include looking for duplicate sub-blocks whereby only a single instance of the sub-block is retained (stored on physical storage) and where pointers or references may be used in connection with duplicate or redundant copies (which reference or identify the single stored instance of the data sub-block).

Figure 11:
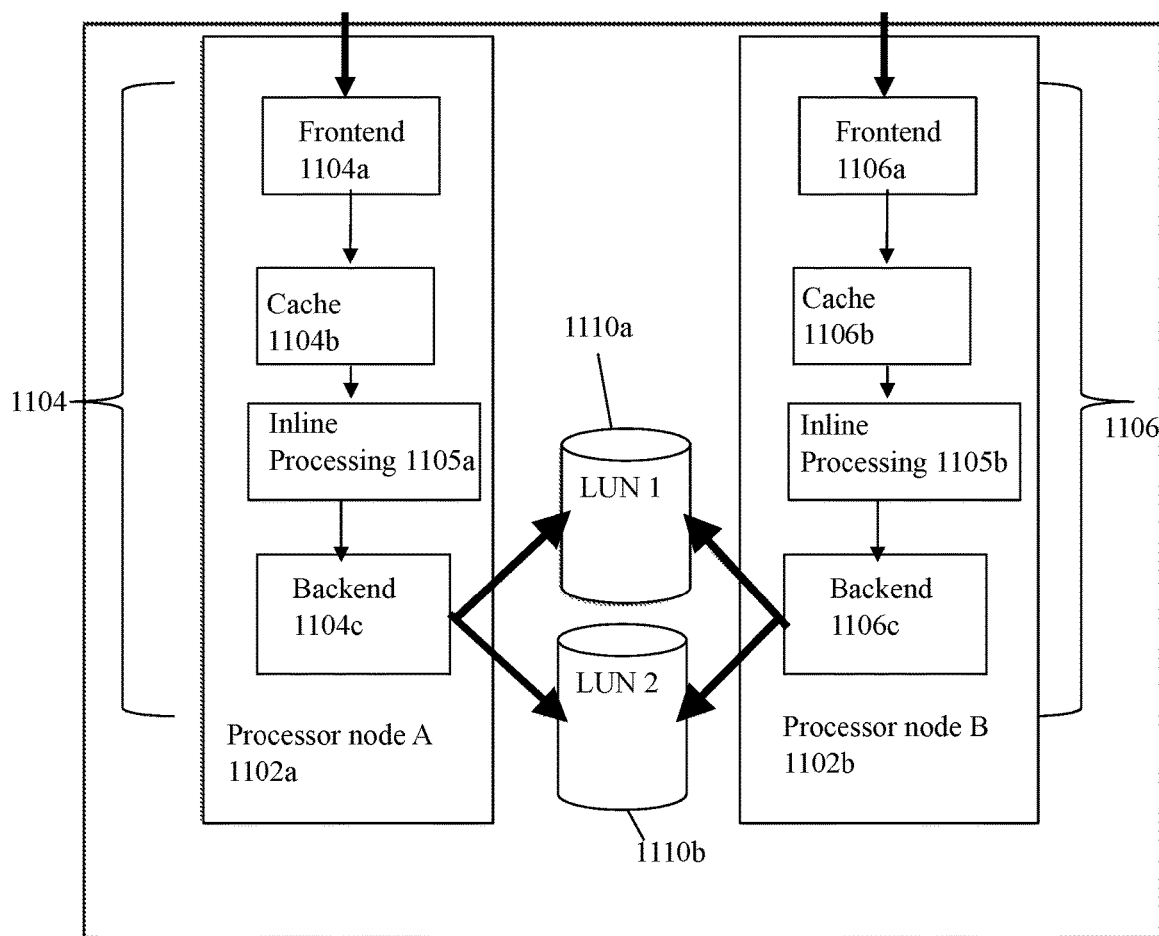
FIG. 11 is an example illustrating in-line processing as may be performed in an embodiment in accordance with the techniques herein.

With reference to FIG. 11, shown is an example 1100 illustrating components that may be included in the data path in at least one existing data storage system in accordance with the techniques herein. The example 1100 includes two processor nodes A 1102a and B 1102b and associated software stacks 1104, 1106 of the data path where I/O requests may be received by either processor node 1102a or 1102b. In the example 1100, the data path 1104 of the processor node A 1102a includes: the frontend (FE) component 1104a (e.g., an FA or front end adapter) that translates the protocol-specific request into a storage system-specific request; a cache layer 1104b (e.g., data cache) where data is temporarily stored; an inline processing layer 1105a; and a backend (BE) component 1104c that facilitates movement of the data between the cache and the permanent non-volatile storage (e.g., back end physical non-volatile storage devices accessed by the BE components such as controllers or device interfaces that access the physical storage). During movement of data in and out of the cache layer 1104b (e.g., such as in connection with reading and writing data respectively, to the physical storage 1110a,

1110b, inline processing may be performed by the layer 1105a. Such inline processing operations of 1105a may be optionally performed and may include any one of more data processing operations in connection with data that is flushed from the cache layer 1104b to the back-end non-volatile physical storage 1110a, 1110b, as well as when retrieving data from the back-end non-volatile physical storage 1110a, 1110b to be stored in the cache layer 1104b. In at least one embodiment, the inline processing may include performing compression and data duplication. Although in following paragraphs reference may be made to inline processing including compression and data deduplication, more generally, the inline processing may include performing any suitable or desirable data processing operations as part of the I/O or data path (e.g., where such operations may include any of compression and data deduplication, as well as any other suitable data processing operation).

In a manner similar to that as described for the data path 1104, the data path 1106 for the processor node B 1102b has its own FE component 1106a, cache layer 1106b, inline processing layer 1105b, and BE component 1106c that are respectively similar to the components 1104a, 1104b, 1105a and 1104c. The elements 1110a, 1110b denote physical storage provisioned for LUNs whereby an I/O may be directed to a location or logical address to read data from, or write data to, the logical address. The LUNs 1110a, 1110b are examples of storage objects representing logical storage entities included in an existing data storage system configuration. Since, in this example, writes directed to LUNs 1110a, 1110b may be received for processing by either of the nodes 1102a and 1102b, the example 1100 illustrates what may also be referred to as an active-active configuration.

In connection with a write operation as may be received from a host and processed by processor node A 1102a, the write data may be written to the cache 1104b, marked as write pending (WP) denoting it needs to be written to physical storage 1110a, 1110b and, at a later point in time, the write data may be destaged or flushed from the cache to the physical storage 1110a, 1110b by the BE component 1104c. The write request may be considered complete once the write data has been stored in the cache whereby an acknowledgement regarding the completion may be returned the host (e.g., by component 1104a). At various points in time, WP data stored in the cache is flushed or written out to the physical storage 1110a, 1110b. In connection with the inline processing layer 1105a, prior to storing the original data on the physical storage 1110a, 1110b, compression and data deduplication processing may be performed that converts the original data (as stored in the cache prior to inline processing) to a resulting form (that may include compressed and/or deduplicated portions) which is then written to the physical storage 1110a, 1110b. In at least one embodiment, when deduplication processing determines that a portion (such as a block or one or more sub-blocks) of the original data is a duplicate of an existing data already stored on the physical storage 1110a, 1110b, that particular portion of the original data is not stored in a compressed form and may rather be stored in its deduplicated form (e.g., there is no need for compression of a block or sub-blocks determined to be duplicates of other existing data). If an original data portion is not a duplicate of an existing portion already stored on the physical storage 1110a, 1110b, the original data portion may be compressed and stored in its compressed form on the physical storage 1110a, 1110b.

In connection with a read operation to read a block of data, a determination is made as to whether the requested read data block is stored in its original form (in the cache 1104b or on the physical storage 1110a, 1110b), or whether the requested read data block was previously deduplicated or compressed. If the requested read data block (which is stored in its original decompressed, non-deduplicated form) is in the cache, the read data block is retrieved from the cache 1104b and returned to the host. Otherwise, if the requested read data block is not in the cache 1104b but is stored on the physical storage 1110a, 1110b in its original form, the requested data block is read by the BE component 1104c from the backend storage 1110a, 1110b, stored in the cache and then returned to the host.

If any sub-block of the requested read data block was previously deduplicated, the original corresponding sub-blocks of the read data block are recreated and stored in the cache in its original form so that it can be returned to the host. If the requested read data block, or unique sub-block thereof, was previously compressed, the block (or compressed portion thereof) is first decompressed prior to sending the read data block to the host. If the compressed read data block or sub-blocks are already stored in the cache, the data may be uncompressed to a temporary or buffer location, the uncompressed data is sent to the host, and the buffer or temporary location is released. If the compressed read data block (or compressed sub-blocks thereof) is not in the cache but stored on the physical storage 1110a, 1110b, the compressed read data block (or compressed portions thereof) may be read from the physical storage 1110a, 1110b into the cache, uncompressed to a buffer or temporary location, and then returned to the host. Thus, requested read data stored on the physical storage 1110a, 1110b may be stored in a deduplicated or compressed form as noted above where processing is performed by the inline processing 1105a to restore or convert the deduplicated or compressed form of the data to its original data form prior to returning the requested read data to the host.

When the processor performs processing, such as in connection with inline processing 1105a, 1105b as noted above, data may be loaded into the cache. In particular, inline compression (ILC) and inline data deduplication (ILD) may be performed as part of the inline processing 1105a, 1105b. In at least one embodiment as noted above, the size of a data block processed by ILC and ILD may be 4K bytes where the block is partitioned into 8 equal sized portions (e.g., 512 bytes each) referred to as sub-blocks or sectors.

In at least one embodiment in accordance with the techniques herein, following paragraphs may provide examples of deduplication processing performed inline as part of the I/O or data path, as described above in connection with ILD processing of FIG. 11. However, it should be noted that the techniques herein are more generally applicable for use in deduplication performed which is not inline or not part of the I/O or data path, such when processing a data set offline or in the background.

Described above are techniques that may be used for performing data deduplication that provide for a smaller or finer level of granularity for determining matching or duplicate data portions at the sub-block or sector level, sometimes referred to herein as partial deduplication, partial block deduplication, or sub-block deduplication. A data block in embodiments described above include 8 sub-blocks identified as sub-blocks 0 through 7. Sub-block 0 for a particular data block may also be referred to as the left-most or "L" sub-block and sub-block 7 for a particular data block may also be referred to as the right most or "R" sub-block. Embodiments of techniques described above for partial or sub-block deduplication, such as in the FIG. 9, include calculating the sub-block or sector hashes for each candidate block and then searching the dedupe DB 150 to determine whether a sub-block of the candidate matches an existing L or R sub-block of a target current stored in the dedupe DB 150. Such processing may be performed for a candidate block which results in no matches being located in the dedupe DB 150.

What will now be described are additional techniques that may be used to further optimize data deduplication processing in an embodiment in accordance with the techniques herein. The following paragraphs provide for further optimizing deduplication processing, for example, in efforts to reduce computational resources when performing partial or sub-block deduplication processing for candidate blocks. In at least one embodiment in accordance with the techniques herein, a distance function may be used to evaluate whether a particular target block is expected to have any sub-block that will match a sub-block of a candidate block. The distance function may be used to provide a measurement or degree of similarity between two data blocks, such as the candidate block and a particular target block. Thus, in at least one embodiment in accordance with the techniques herein, a decision may be made using a distance value computed using a distance function as to whether to look for partial or sub-block matches for the candidate block within that particular target block. In at least one embodiment, a threshold may be defined for use with computed distances. If a distance computed with respect to two data blocks using the distance function is less than the threshold, the two data blocks may be similar and expected to have one or more matching sub-blocks. Otherwise, if the distance computed with respect to two data block using the distance function is not less than the threshold, the two data blocks may not be similar and are not expected to have one or more matching sub-blocks.

In the following paragraphs and examples, reference is made to data blocks that are each 4K bytes in size and wherein each of the data blocks includes 8 sub-blocks or sectors (e.g., each sub-block or sector being 512K bytes) for purposes of illustration. Generally, each data block may be any suitable size and may include any suitable number of sub-blocks, where each sub-block may be any suitable size.

Reference is made back to the dedupe DB 150 of FIG. 1. In at least one embodiment, the dedupe DB 150 may be stored in a portion of the memory 130 used as a cached copy of the dedupe DB 150. The dedupe DB 150 stored in the memory, such as a cache, may be only a subset or portion of the actual total number of entries of the on-disk dedupe DB as stored persistently on non-volatile physical storage. In at least one embodiment, deduplication processing may be performed using only the portion of the dedupe DB currently in the memory or the cache without retrieving other portions of the dedupe DB from the non-volatile storage. In other words, if a look up for a digest of a sub-block is performed and there is no matching entry in the cached portion of the dedupe DB 150, in such an embodiment there is no further lookup in the on-disk dedupe DB and processing determines that there is no entry in the dedupe DB for digest (e.g., sub-block is unique and not a duplicate).

In an embodiment in accordance with the techniques herein, the dedupe DB 150 may include entries for the L and R sub-blocks of each target block as described above in connection with FIG. 1. Additionally, the dedupe DB 150 may also include entries for the digest of each complete or full target data block (e.g., formed using all 8 sub-blocks of the target block). Thus, each entry of the dedupe DB 150 may include a digest, an associated digest key type of L (for digests of the L sub-block), R (for digests of the R sub-block) or F (for digests of the full target data block), and a reference (ref), to a location in the data storage system, of a data block. More generally, the reference field of an entry that is of one of the types L, R or F maps to a location in some form of memory or storage containing a data block whereby the reference field is used to access the actual content stored in the data block. The foregoing and other features are described below in more detail.

If an entry of the dedupe DB has a digest key type of L, the entry includes a digest of an L sub-block of a particular target data block stored at the location identified by the reference field of the entry. If an entry of the dedupe DB has a digest key type of R, the entry includes a digest of an R sub-block of a particular target data block stored at the location identified by the reference field of the entry. If an entry of the dedupe DB has a digest key type of F, the entry includes a digest of a full target data block and the content of the target data block having the digest may be obtained using the reference field of the entry.

In at least one embodiment in accordance with the techniques herein, deduplication processing may include first performing full block deduplication processing to determine whether there is a full or complete data block match between a target block and a candidate block for which deduplication processing is performed. Responsive to determining there is no full or complete match between a target block and a candidate block, partial or sub-block deduplication processing may be performed.

The digest entries of the dedupe DB 150 with an associated F digest key type may denote digests used in connection with performing the full block deduplication processing in at least one embodiment in accordance with the techniques herein. The hash function or algorithm used to generate the full data block or F type digests in an embodiment may generally be any suitable function having an acceptable expected hash collision probability or level of hash resistance. In at least one embodiment, the hash function used to compute full block digests of F type entries of the dedupe DB, and more generally, compute full block digests of data blocks for full block deduplication processing may be a cryptographic hash function such as SHA-1 or SHA-256.

When performing full block deduplication processing for a candidate block, at least one embodiment of the techniques herein may include computing the full block digest for the candidate block and comparing the computed full block digest for the candidate to the F type digest entries of the dedupe DB 150 to determine whether there is a match between the computed full block digest for the candidate and a digest of an F-type entry of a target block of the dedupe cache 150. If a match is found, processing may then be performed to compare (e.g., byte-by-byte) the content of the candidate block with the content of the target block having the matching F-type entry of the dedupe cache 150 and ensure the actual data contents of the candidate and target blocks match. If the actual contents of the candidate and target blocks match, processing then proceeds to store the candidate block as a full deduplicated block (e.g., duplicate of target block). If no complete full block match is found between a target block and the candidate block, partial or sub-block deduplication may be performed.

Consistent with discussion elsewhere herein, for a candidate block that is found to be unique (e.g., whereby there is no matching target block and no matching partial or sub-block deduplication performed), the candidate block may be stored as a new target block and processing may include persistently storing the content of the new target block and additionally storing digests for the new target block in the dedupe DB 150. In at least one embodiment, such processing for the new target block may include creating corresponding L, R and F entries for the new target block in the dedupe DB 150.

As noted above, an embodiment in accordance with the techniques herein may use a distance function to provide a measurement or degree of similarity between two data blocks, such as a candidate block and a particular target block. In at least one embodiment, the logical exclusive-or (XOR) function or operation may be used in connection with defining a distance function D(x,y) that provides a measurement of similarities with respect to the data content of two data blocks, x and y. More formally, in at least one embodiment, D(x,y) may be a numerical value that is a distance measurement with respect to a pair of data blocks, x, and y, where the following properties hold:

1. D (x,y)>0.
2. D (x,y)=0 if, and only if x=y.
3. D (x,y)=D (y,x).

Furthermore for an additional data block z,

4. D (x,y)<D (x,z)+D (z,y)

In connection with the techniques herein where D is determined with respect to data blocks x and y, z may be any arbitrary data block in the same data space as the data blocks x and y.

In at least one embodiment, D(x,y) may be defined as a distance function using the XOR function or operation applied to respective bits/bytes of data of the two data blocks, x and y. The distance function D(x,y) may be defined as a normalized value based on the number of total number of data cells or positions, such as number of sub-blocks or sectors, in the data blocks x and y. More formally, D(x,y) may be defined as:

$$D(x,y) = (\Sigma_{i=0}^{N-1} x(i) \text{ XOR } y(i))/N \qquad \text{EQUATION 1}$$

where

N is the number of sub-blocks or sectors in the data blocks x and y, assuming 0-based sub-block numbering;

x(i) denotes the data content of sub-block or sector "i" in data block x;

y(i) denotes the data content of sub-block or sector "i" in data block y; and

XOR denotes the logical exclusive OR operation as applied to corresponding bit positions of the two corresponding sub-blocks or sectors of data, x(i) and y(i). The following summarizes the logical XOR operation as known in the art based on 2 binary input values:

| Input values | | XOR result |
| --- | --- | --- |
| 0 | 0 | 0 |
| 1 | 0 | 1 |
| 0 | 1 | 1 |
| 1 | 1 | 0 |

Thus at the sub-block level, a resulting XOR value of 0 for the $i^{th}$ sub-block denotes that contents of the $i^{th}$ sub-block of B1 and T1 are the same, and a value of 1 for the $i^{th}$ sub-block denotes that contents of the $i^{th}$ sub-block of B1 and T1 are different.

It should be noted that the numerator and the denominator of EQUATION 1 are with respect to the total number of sub-blocks in the data blocks B1 and T1, where the numerator denotes how many of the 8 sub-blocks of B1 and T1 are different. More generally, an embodiment may compute the distance with respect to the total number of bit positions or byte positions in the data blocks B1 and T1, or any suitable groupings of the bits.

The distance computed using EQUATION 1 may be characterized as a normalized value based on the total number of sub-blocks or sectors in each data block. It will be appreciated by those skilled in the art that further variations of techniques herein may use computed distances that are not normalized. For example, an embodiment in accordance with the techniques herein may simply use the numerator computed based on EQUATION 1 as the computed distance values where such computed distances are not normalized. In such an embodiment, the specified threshold discussed elsewhere herein may be an integer threshold quantity.

In at least one embodiment in accordance with the techniques herein, a decision may be made using the distance function D(x,y), where x=candidate block B1 and y=target block T1, denoting a measurement of similarity between B1 and T1, as to whether to look for partial or sub-block matches for the candidate block B1 within that particular target block T1. For example, lower distance values may denote a higher degree of similarity between B1 and T1. If D(B1, T1) is less than a specified threshold distance denoting a threshold level of similarity, then it may be determined that B1 and T1 have at least the specified threshold level of similarity. Comparatively, smaller computed distance values that are less than the threshold level denote a smaller distance or smaller assessed difference between B1 and T1 and may be characterized as having a higher degree or level of similarity than that denoted by the threshold (e.g., such smaller computed distance values exceed the minimum required similarity denoted by the threshold). Larger computed distance values that are more than the threshold level denote a larger distance or larger assessed difference between B1 and T1 and may be characterized as having a lower degree or level of similarity than that denoted by the threshold (e.g., such larger computed distance values do not meet the minimum required similarity denoted by the threshold). In at least one embodiment, if D(x,y) (e.g., as computed using EQUATION 1), is less than the threshold, then blocks x and y are similar; and otherwise x and y are determined as not similar. If two data blocks are evaluated as being similar using the threshold and a distance computed using EQUATION 1 with respect to the two data blocks, it is expected that at least one sub-block of the two data blocks will match when the contents of the two data blocks are examined (e.g., such as by data content comparison at the sub-block level).

In at least one embodiment, the distance function such as expressed in EQUATION 1 may be applied to the candidate block B1 and the target block T1 as noted above. To further illustrate, reference is made to the FIG. 12.

Figure 12:
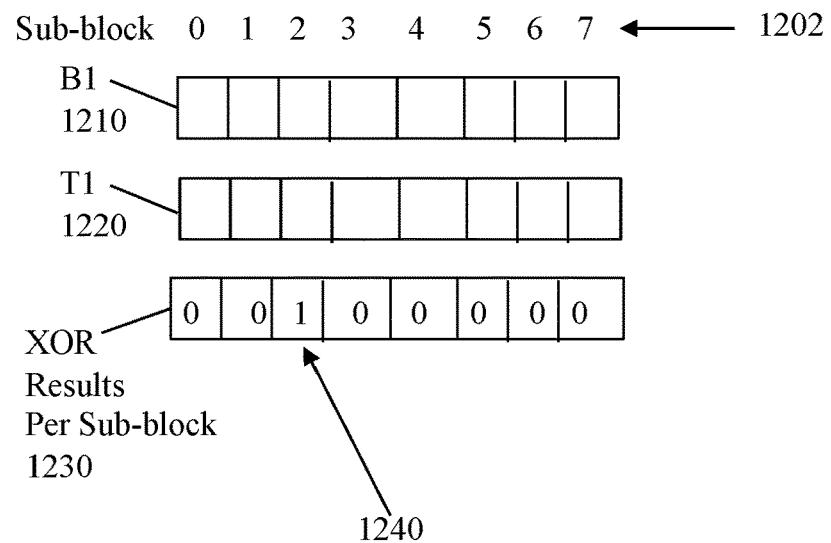
FIGS. 12 and 13 are examples illustrating processing that may be performed in embodiments in accordance with the techniques herein.

The example 1200 of FIG. 12 includes the candidate block B1 1210, target block T1 1220 and XOR results per sub-block 1230. The element 1202 denotes the 8 sub-block or sector positions of the data blocks B1 and T1. T1 may be an existing target block and B1 may be a candidate block for which deduplication processing is being performed. In at least one embodiment, full block deduplication processing for B1 has been performed and failed to find a matching target block (e.g., B1 is not fully dupable). As such, processing may now be performed using the techniques herein in connection with partial or sub-block deduplication processing. The distance function as in EQUATION 1 may be used to determine whether to perform partial deduplication processing of B1 with respect to T1. Using the distance function of EQUATION 1, processing may compute a distance of B1 with respect to T1, denoting a measurement of similarity between B1 and T1. If the distance as computed using EQUATION 1 is less than a specified threshold, B1 and T1 are similar and the contents of B1 is expected to be similar to the contents of T1. In contrast, if the distance as computed using EQUATION 1 is not less than the specified threshold, B1 and T1 are not similar and the contents of B1 is not expected to be similar to the contents of T1. Thus, the distance computed using EQUATION 1 is a metric that provides a measurement denoting the degree of similarity between B1 and T1. The computed distance may be used to decide whether to further examine B1 and T1 to determine any sub-block of T1 matching a sub-block of B1.

With reference to FIG. 12, the element 1230 denotes the XOR operation results of B1 1210 and T1 1220 per sub-block for each of the 8 sub-block positions, where a value of 0 in the $i^{th}$ cell or entry of 1230 denotes that contents of the $i^{th}$ sub-block of B1 and T1 are the same, and a value of 1 in the $i^{th}$ cell or entry of 1230 denotes that contents of the $i^{th}$ sub-block of B1 and T1 are different. The element 1240 denotes that a single entry of 1230 for sub-block 2 has a value of 1. Based on EQUATION 1, the computed distance D is 1/8=0.125. Assume the specified threshold is, for example, 0.50. Thus, the computed distance D=0.125 is less than the specified threshold of 0.50, whereby B1 and T1 are determined as similar and have at least the specified degree of similarity indicated by the threshold.

Responsive to determining the computed distance D(B1, T1) is less than the threshold of 0.50, processing may determine that B1 and T1 are similar whereby partial deduplication processing may examine sub-blocks of T1 to determine whether one or more sub-blocks of B1 match one or more sub-blocks of T1. In at least one embodiment, partial or sub-block deduplication may be performed with respect to B1 and T1 as described above such as in connection with FIG. 9. For example, processing may examine the computed XOR results of 1230 to look for those sub-blocks or sectors having a resulting XOR value of 0 denoting that such sub-blocks of B1 and T1 match whereby such sub-blocks of B1 may be deduplicated since they are duplicates of T1. In the example 1200, processing may determine that all sub-blocks of B1 may be deduplicated as duplicates of sub-blocks of T1 except for sub-block 2 (having a 1 in the corresponding sub-block position 2 of the XOR results 1230). Processing may be performed, for example, as described in connection with steps 960 and 970 of FIG. 9 and may identify two duplicate ranges of B1—range 1 for sub-blocks 0-1 of B1 that match sub-blocks 0-1 of T1; and range 2 for sub-bocks 3-7 of B1 that match sub-blocks 3-7 of T1. Additionally, such processing may identify a unique region or range for sub-block 2 of B1 that cannot be deduplicated.

If no match is found between a sub-block digest for candidate B1 and an L or R digest for T1, partial deduplication processing may proceed to examine another existing target block T2 and assess whether to perform partial deduplication processing of B1 with respect to T2. Thus, T2 may be processed and assessed in a manner similar to that as described herein for the target block T1 as in connection with FIG. 12.

In at least one embodiment, calculation of the distance based on EQUATION 1 may be performed prior to perform full block deduplication processing. If the computed distance D(B1, T1)=0, it means that B1=T1 whereby B1 is a full block duplicate of T1, and B1 may be completely deduplicated at the data block level as a duplicate of T1. In this case, no partial or sub-block deduplication is needed.

It should be noted that computation of the distance with respect to the 2 blocks T1 and B1 based on EQUATION 1 requires use of the actual data content of both blocks. It may be, for example, that although computed digests for T1 are in a cached copy of the dedupe DB 150, the actual data content of T1 is not and may therefore need to be retrieved from persistent storage, such as non-volatile backend storage 190 (of FIG. 1).

As such what will now be described is another embodiment in accordance with the techniques herein that may be characterized as a variation of the distance function as described above in connection with the EQUATION 1 and the FIG. 12. Rather than use the actual data content of the data blocks in connection with computing the distance D for two data blocks, x and y, what will now be described is another embodiment in which the distance denoting similarities between data blocks x and y is determined using full block digests for x and y, where the full block digests are computed using a distance preserving hash function (described in more detail below). In such an embodiment, the distance may be computed using the full block digests for x and y thereby not requiring access to the actual data content of both x and y at the time the distance is computed. Such a computed distance with respect to blocks x and y may be used to draw an inference about the similarities within the two blocks (e.g., regarding the data content of the 2 blocks) without comparing the contents of the two blocks.

In such an embodiment, a hash function or algorithm may be used to compute another type of full block digest entry referred to herein as a W type digest entry. A W type digest entry may include a digest computed by a hash function or algorithm using all the content for the data block (e.g., all 8 sub-blocks) where the hash function or algorithm may be characterized as a distance preserving hash function described in more detail below. The W type entry may be a digest entry included in the dedupe DB 150 including fields as described herein, for example, for F type digest entries with the difference that a W type entry includes a digest computed using a distance preserving hash function H. A W type entry may be computed for each target block and stored in the dedupe DB 150. More generally, the distance preserving hash function may be used to compute hash values or digests for data blocks where such hash values or digests are used in connection with computing distances (e.g., based on EQUATION 2 described below).

In at least one embodiment, different hash functions or algorithms may be used in computing full block hashes or digests, such as digests of F type entries in the dedupe DB 150 used in connection with full block deduplication and other full block hashes, and such as digests of W type entries in the dedupe DB 150 used in connection with computing hashes or digests used with distance calculations (e.g., such as in the EQUATION 2 and FIG. 13 described below). In connection with computing digests or hashes of blocks used with full block deduplication, a first hash function may be used that is not a distance preserving hash function (as described in more detail below). Generally, such a first hash function may be a stronger hash function in comparison to a second hash function that is distance preserving and used to compute hashes or digests used with distance computation. The first hash function may be selected with a goal of minimizing hash collisions and may therefore have a low probability of hash collision (e.g., such as in comparison to the second distance preserving hash function). For example, the first hash function may be a cryptographic hash function, such as SHA-1 or SHA-256 that is resistant to hash collisions. In contrast, the second hash function that is a distance preserving hash function may be a non-cryptographic hash function that is less computationally expensive and weaker relative to the first hash function and therefore the second hash function may have a higher hash collision probability that the first hash function. For example, in at least one embodiment, a hash function may compute a CRC (cyclic redundancy check) value for a data block where such a hash function may be used as the distance preserving hash function and where the generated CRC value for a data block may be used as the hash value or digest for the data block in distance calculations.

To measure the distance D between two data blocks, a hash function H, also referred to herein as a distance preserving hash function, may be used that preserves the distance property between data blocks such that the distance between the hashes of the two blocks will correspond to the distance (e.g., similarity or differences) between the bits of the two blocks. The distance function between the data blocks and the hashes of such data blocks preserve the relation between two pairs of data blocks with similar content to each other. For example, assume two blocks with bit contents b1 and b2 that are to be compared for similarities by measuring the distance, (b1,b2) between them. The hash function H may be used to compute the full hash hashes of type W that preserves the distance relation between D(b1,b2) and D(H(b1),H(b2)). The distance function between two blocks and the distance function used for the two hashes of such blocks may be different and still preserve the relation between hashes and data chunks.

Lemma 1 may be defined as follows:
If (b1, b2 and b3) are three blocks of the same size; and $D_{12}$ and $D_{13}$ are the corresponding distances of each pair, where $D_{12}$=D (b1,b2) is the distance between b1 and b2, and $D_{13}$=D(b1, b3) is the distance between b1 and b3, then a distance preserving hash function H may be defined to determine hash values for all 3 blocks, b1, b2, and b3 where:
H1=H(b1) is the computed hash for b1 using the hash function H;
H2=H(b2) is the computed hash for b2 using the hash function H;
H3=H(b3) is the computed hash for b3 using the hash function H;
$d_{12}$=D(H1, H2) and $d_{13}$=D(H1, H3) (e.g., distances between hash values); and
if $d_{12}$<$d_{13}$ then $D_{12}$<$D_{13}$ Thus, based on Lemma 1 above, a distance preserving hash function has the property:
if $d_{12}$<$d_{13}$ then $D_{12}$<$D_{13}$
whereby the hash function H preserves the distance relation between the data blocks (e.g., D(b1, b2)) and the hash values of such data blocks (e.g., D(H(b1), H(b2))). In other words, the relative distance between blocks are preserved when computing the distance using the calculated hash values for such blocks.

In at least one embodiment, another distance function DD may be defined using hash values or digests computed using a distance preserving hash function H as follows:

$$DD(Hx,Hy)=(\Sigma_{i=0}^{N-1}Hx(i) \text{ XOR } Hy(i))/N \quad \text{EQUATION 2}$$

Where
H is a distance preserving hash function;
Hx is the computed hash value using hash function H for the data block x;
Hy is the computed hash value using hash function H for the data block y;
N is the number of bytes in each of the computed hash values Hx and Hy, assuming 0-based byte numbering;
Hx(i) denotes byte "i" in the computed hash value Hx for the data block x;
Hy(i) denotes byte "i" in the computed hash value Hy for the data block y; and
XOR denotes the logical exclusive OR operation as applied to corresponding bit positions of the two corresponding bytes of the computed hash values, Hx(i) for data block x and Hy(i) for data block y.

Generally, based on EQUATION 2, the XOR function is applied to the hash values of the data blocks x and y rather than, as in EQUATION 1, where the XOR function is applied to the data blocks themselves.

It should be noted that the numerator and the denominator of EQUATION 2 are with respect to the total number of bytes in the computed hash values Hx, Hy, where the numerator denotes how many of the bytes of such computed hash values Hx, Hy are different. As a variation, an embodiment may compute the distance with respect to the total number of bit positions or other grouping of bits in the compute hash values Hx, Hy.

The distance computed using EQUATION 2 may be characterized as a normalized value based on the total number of bytes in each hash value. It will be appreciated by those skilled in the art that further variations of techniques herein may use computed distances that are not normalized. For example, an embodiment in accordance with the techniques herein may simply use the numerator computed based on EQUATION 2 as the computed distance values where such computed distances are not normalized. In such an embodiment, the specified threshold discussed elsewhere herein may be an integer threshold quantity.

In at least one embodiment in accordance with the techniques herein, a decision may be made using the distance function DD(Hx,Hy) as to whether to look for partial or sub-block matches for the candidate block B1 within that particular target block T1, where x=the candidate block B1, Hx is the hash value for B1 computed using the distance preserving hash function H, y=the target block T1, and Hy is the hash value for T1 computed using the distance preserving hash function H. In this manner, using the distance preserving hash function H and computed hash values, the distance function DD of EQUATION 2 denotes a measurement of similarity between the blocks B1 and T1. For example, lower distance values may denote a higher degree of similarity between B1 and T1. If DD (H(B1), H(T1)) of EQUATION 2 is less than a specified threshold distance denoting a threshold level of similarity, then it may be determined that B1 and T1 have at least the specified threshold level of similarity. Comparatively, smaller computed distance values that are less than the threshold level denote a smaller distance or smaller assessed difference between B1 and T1 and may be characterized as having a higher degree or level of similarity than that denoted by the threshold (e.g., such smaller computed distance values exceed the minimum required similarity denoted by the threshold). Larger computed distance values that are more than the threshold level denote a larger distance or larger assessed difference between B1 and T1 and may be characterized as having a lower degree or level of similarity than that denoted by the threshold (e.g., such larger computed distance values do not meet the minimum required similarity denoted by the threshold). In at least one embodiment, if DD(H(B1), H(T1)) (e.g., as computed using EQUATION 2), is less than the threshold, then blocks B1 and T1 are similar; and otherwise B1 and T1 are determined as not similar.

In at least one embodiment, the distance function such as expressed in EQUATION 2 may be applied to the candidate block B1 and the target block T1 as noted above. To further illustrate, reference is made to the FIG. 13. In the example 1300 of FIG. 13, a hash value that is 20 bytes in length is used for purposes of illustration. More generally, an embodiment may use any suitable size hash value as the digests for the blocks.

Figure 13:
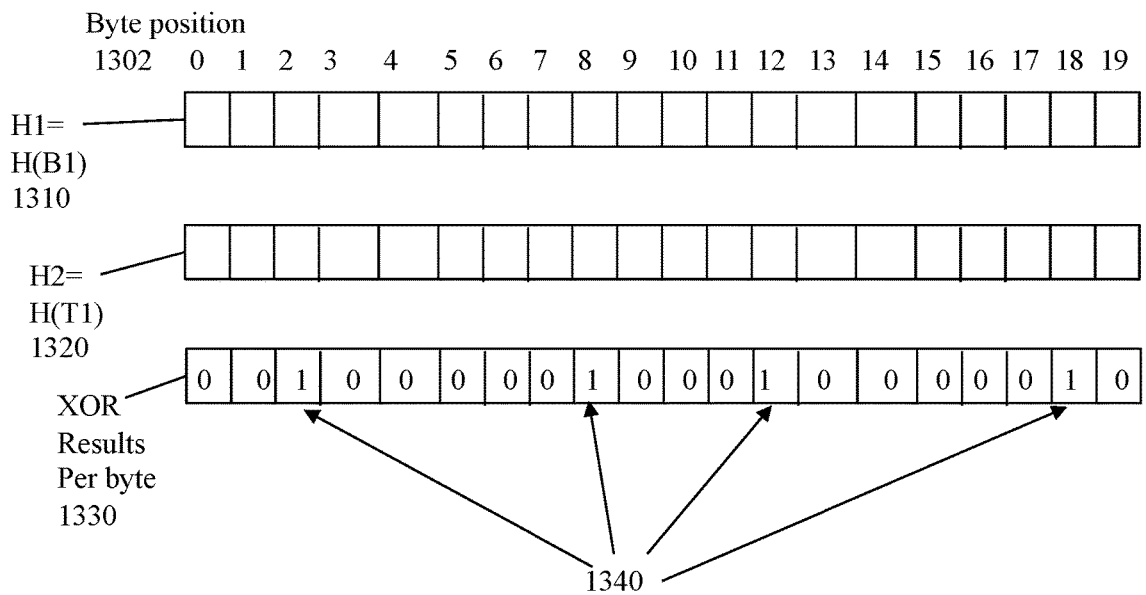

The example 1300 of FIG. 13 includes the hash value H1=H(candidate block B1) 1310, H2=H(target block T1) 1320, and the XOR results per byte 1330. The element 1302 denotes the 20 bytes of the computed hash values H1, H2, respectively, for the data blocks B1 and T1. As described in connection with FIG. 12, T1 may be an existing target block and B1 may be a candidate block for which deduplication processing is being performed. In at least one embodiment, full block deduplication processing for B1 has been performed and failed to find a matching target block (e.g., B1 is not fully dedupable). As such, processing may now be performed using the techniques herein in connection with partial or sub-block deduplication processing. The distance function as in EQUATION 2 may be used to determine whether to perform partial deduplication processing of B1 with respect to T1. Using the distance function of EQUATION 2, processing may compute a distance with respect to the hash values of B1 and T1, denoting a measurement of similarity between B1 and T1. If the distance as computed using EQUATION 2 is less than a specified threshold, B1 and T1 are similar and the contents of B1 is expected to be similar to the contents of T1. In contrast, if the distance as computed using EQUATION 2 is not less than the specified threshold, B1 and T1 are not similar and the contents of B1 is not expected to be similar to the contents of T1. Thus, the distance computed using EQUATION 2 is a metric that provides a measurement denoting the degree of similarity between B1 and T1.

With reference to FIG. 13 the element 1330 denotes the XOR operation results of H1 1310 and H2 1320 per byte for each of the 20 byte positions, where a value of 0 in the $i^{th}$ cell or entry of 1330 denotes that contents of the $i^{th}$ byte of H1 and H2 are the same, and a value of 1 in the $i^{th}$ cell or entry of 1330 denotes that contents of the $i^{th}$ byte of H1 and H2 are different. The element 1340 denotes that 4 entries of 1230 for sub-blocks 2, 8, 12 and 18 each have a value of 1. Based on EQUATION 2, the computed distance DD is 4/20=0.20. Assume the specified threshold is, for example, 0.50. Thus, the computed distance DD=0.20 is less than the specified threshold of 0.50, whereby B1 and T1 are determined as similar and have at least the specified degree of similarity indicated by the threshold.

Responsive to determining the computed distance DD(H1, H2) is less than the threshold of 0.50, processing may determine that B1 and T1 are similar whereby partial deduplication processing may examine sub-blocks of T1 to determine whether one or more sub-blocks of B1 match one or more sub-blocks of T1. In at least one embodiment, partial or sub-block deduplication may be performed with respect to B1 and T1 in a manner similar to that as described above such as in connection with FIG. 9. For example, processing may compute sub-block digests for the sub-blocks of the candidate B1 (e.g., step 930) and compare (e.g., step 940) such computed sub-block digests for the candidate B1 to the L and R digests for the L and R sub-blocks of T1 as stored in the dedupe DB 150. If a match is found between a sub-block digest for candidate B1 and an L or R digest for T1, (step 950 evaluates to yes), processing of step 960 and 970 of FIG. 9 may be performed. If no match is found between a sub-block digest for candidate B1 and an L or R digest for T1, partial deduplication processing may proceed to examine another existing target block T2 and assess whether to perform partial deduplication processing of B1 with respect to T2. Thus, T2 may be processed and assessed in a manner similar to that as described herein for the target block T1 as in connection with FIG. 13.

As a variation to that as described above, responsive to determining the distance between B1 and T1 as computed using EQUATION 2 is less than the threshold, an embodiment may perform partial or sub-block deduplication of B1 with respect to T1 by simply performing a byte-by-byte comparison of B1 and T1 to determine which bytes of B1 and T1 match. In this latter variation, an embodiment may omit calculating the sub-block level digests for the sub-blocks of B1 and may omit comparing such sub-block digests for B1 to sub-block L and R digests for T1 as stored in the dedupe DB 150. Processing may be performed, for example, as described in connection with steps 960 and 970 of FIG. 9 to identify one or more duplicate sub-block ranges of B1 that match sub-blocks of T1. Additionally, such processing may identify one or more unique regions or ranges of B1 that cannot be deduplicated, such as using sub-blocks of T1.

In at least one embodiment, full block deduplication processing may be performed prior to calculation of the distance based on EQUATION 2 and prior to perform partial or sub-block level deduplication processing. For example, full block deduplication processing may be performed by calculating a first full block digest for B1, and then comparing the first full block digest for B1 to other full block digests of F type entries for target blocks stored in the dedupe DB 150. Such full block deduplication processing may be unsuccessful in full block deduplication of B1 (e.g., failed to locate a digest of an F type entry for a target block in the dedupe DB 150 matching the first full block digest for B1). If the candidate block B1 does not match an existing target block, partial or sub-block deduplication may be performed, such as using the computed distance DD of EQUATION 2 with respect to the candidate block B1 and one or more target blocks. If the computed distance DD of EQUATION 1 with respect to a particular target block T is less than a specified threshold, then further processing may be performed to locate sub-blocks of B1 matching sub-blocks of T whereby B1 may be partially deduplicated using one or more sub-blocks of T1.

Generally, any suitable hash function or algorithm that is a distance preserving hash function as described herein may be used in an embodiment in accordance with the techniques herein. For example, as noted above in at least one embodiment, the distance preserving hash function used in connection with computing digests or hashes used with distances (e.g., as in EQUATION 2) may be a CRC function that computes a CRC value or checksum value for a data block.

Computation of CRC values or checksum values for input data, such as data blocks, using a CRC function is known in the art. CRC is a checksum algorithm typically used to detect inconsistencies of data during data transmission. A checksum, calculated by CRC, is typically attached to the data during data transmission. CRC is generally based on division where the input data block is interpreted as a binary bit stream (e.g., dividend) that is divided by another fixed binary number (e.g., divisor). The remainder of this division is the checksum value. The binary numbers used as the dividend and divisor are treated as binary polynomials where the bits of such binary numbers are used as coefficients of the polynomials. The divisor may also be referred to as a generator polynomial that is statically defined using the CRC algorithm, where CRC-n denotes use of a fixed defined generator polynomial with "n+1" bits. Generally, the CRC checksum may be defined as the remainder after repeatedly performing XOR operations using the generator polynomial or divisor.

A CRC function is typically used in computing CRC values or checksum values used as error correcting codes. The CRC function is less frequently, and not so typically, used as a hashing algorithm due to the fact that the collision probability is higher with a CRC hash function than other hashing algorithms, such as cryptographic hashing. In other words, in comparison to stronger hashing algorithms, the probability is greater using a CRC hash function that two different data blocks will have the same CRC value. For example, the first bit sequence 10110110 01110000 and the second bit sequence 10010110 01110000 differ by one bit yet the CRC of both (e.g., CRC=01110000) are identical due to the correction factor for the changed bit. However, from the perspective of identifying similarities between blocks in at least one embodiment, it is desirable to use CRC values as the hashes or digests for distance calculations, such as described herein with EQUATION 2. The CRC can correct only a certain number of bits meaning that similar data blocks have corresponding CRC values where a majority of the bits may be identical except for a small number of different bits. Thus, unlike cryptographic hash functions that may be used for full block deduplication in at least one embodiment, CRC is an easily reversible function which makes it suitable for detecting similarities between data blocks. However, in at least one embodiment, a hash function that calculates CRC values may not be suitable for digests of blocks used in connection with full block deduplication.

What will now be described are flowcharts of processing steps that may be performed in an embodiment in accordance with the techniques herein where such flowcharts summarize processing described above.

Figure 14:
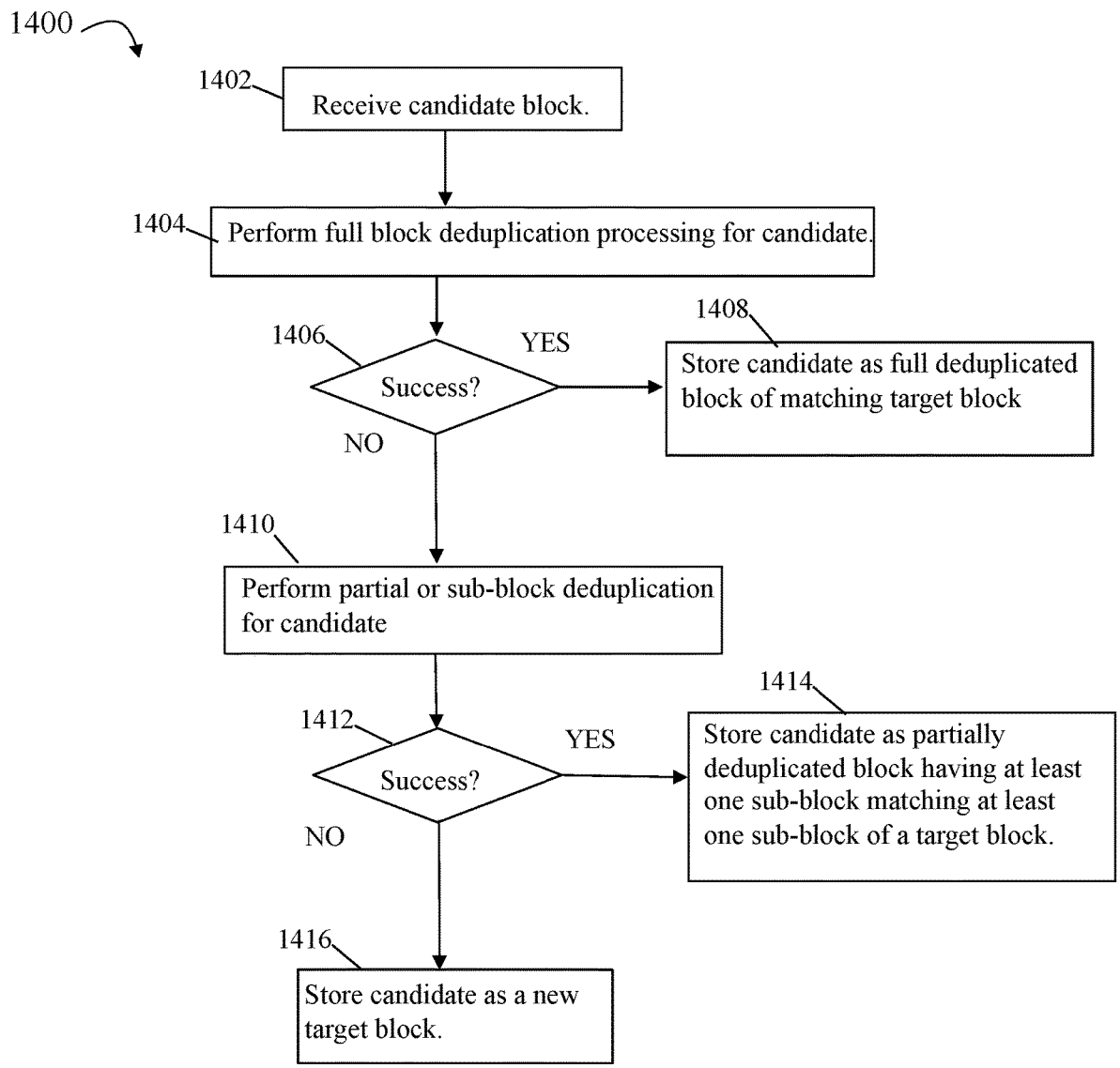
FIGS. 14, 15 and 16 are flowcharts of processing steps that may be performed in embodiments in accordance with the techniques herein.

Referring to FIG. 14, shown is a first flowchart 1400 of processing steps that may be performed in an embodiment in accordance with the techniques herein. The flowchart 1400 indicates processing steps that may be performed for a single candidate block whereby the steps of the flowchart 1400 may be repeated for subsequent candidate blocks.

At the step 1402, a candidate block is received. From the step 1402, control proceeds to the step 1404. At the step 1404, full block deduplication processing is performed for the candidate where the candidate is determined as a full block match of an existing target block. From the step 1404, processing proceeds to the step 1406. At the step 1406, a determination is made as to whether full block deduplication processing of step 1404 successfully located an existing target block that matches the candidate block. If the step 1406 evaluates to yes, control proceeds to the step 1408 where the candidate block is stored as a full deduplicated block of the matching target block.

If the step 1406 evaluates to no, control proceeds to the step 1410. At the step 1410, partial or sub-block deduplication processing is performed for the candidate block. From the step 1410, control proceeds to the step 1412. At the step 1412, a determination is made as to whether partial or sub-block deduplication processing of step 1410 successfully located an existing target block that having at least one sub-block matching at least one sub-block of the candidate block. If the step 1412 evaluates to yes, control proceeds to the step 1414 to store the candidate block as a partially deduplicated block having at least one sub-block that matches a sub-block of an existing target block. It should be noted that an embodiment may allow a single candidate block to be partially deduplicated with respect to one or more existing target blocks. If the step 1412 evaluates to no, control proceeds to the step 1416 to store the candidate as a new target block. The step 1416 may include persistently storing content of the candidate block on physical storage and also in cache. The step 1416 may include calculating one or more digest values for the new target block and storing such digest values as new entries in the dedupe DB 150. The one or more digest values may include an F type digest entry, and a W type digest entry for the new target block. Depending on the embodiment and the particular partial deduplication processing performed, the step 1416 may include storing an R type digest entry and an L type digest entry for the new target block.

Figure 15:
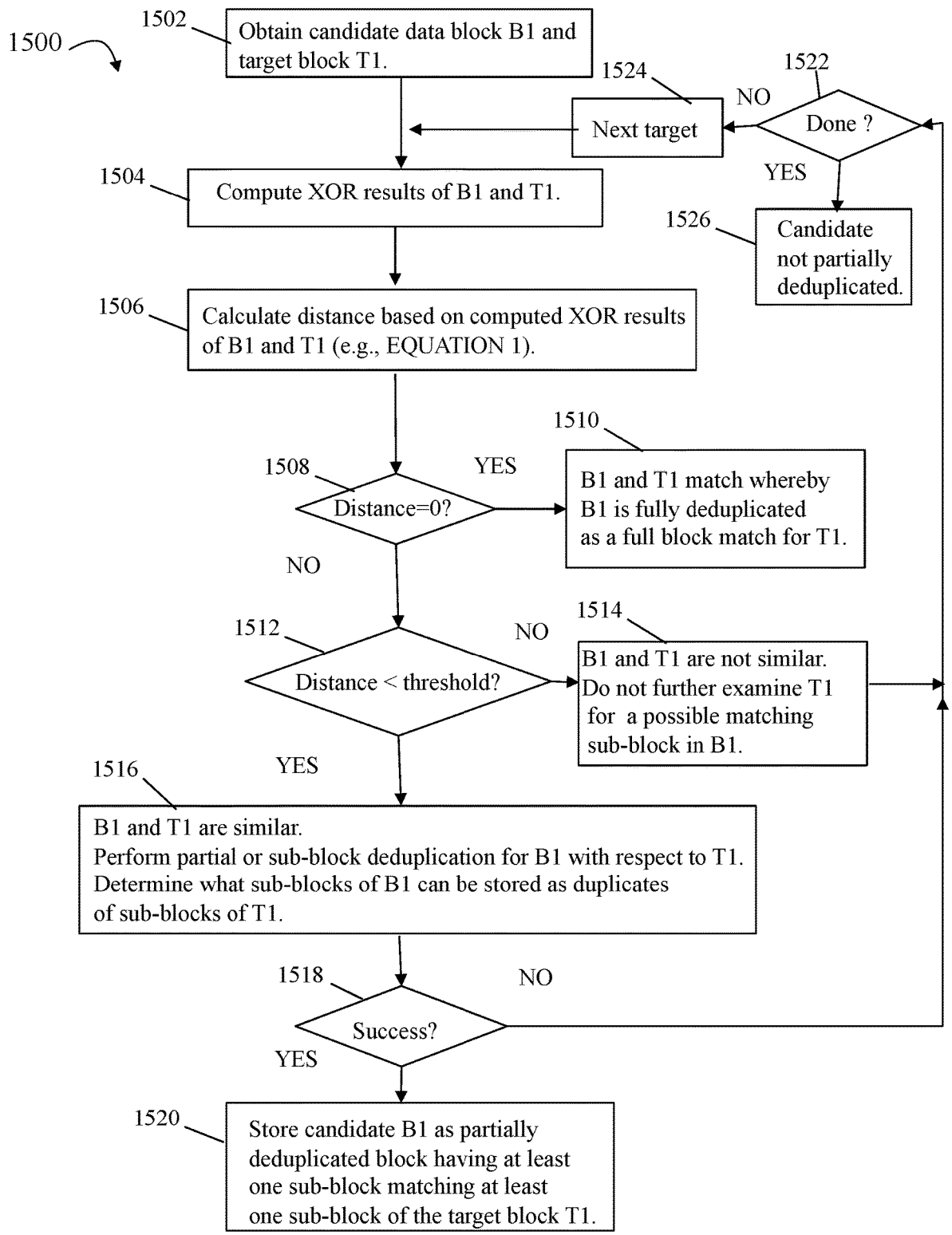

Referring to FIG. 15, shown is a second flowchart 1500 of processing steps that may be performed in an embodiment in accordance with the techniques herein. The flowchart 1500 provides additional detail regarding one particular embodiment in which the distance function is computed, such as in EQUATION 1, based on the XOR of the data blocks B1 and T1. The flowchart 1500 indicates processing steps that may be performed for a single candidate block whereby the steps of the flowchart 1500 may be repeated for subsequent candidate blocks.

At the step 1502, the candidate block B1 and a target block T1 are obtained. From the step 1502, control proceeds to the step 1504 where processing is performed to compute the bit-wise XOR result of B1 XORed with T1. From the step 1504, control proceeds to the step 1506. At the step 1506, the distance between B1 and T1 is calculated as in EQUATION 1 based on the computed XOR results from step 1504. From the step 1506, control proceeds to the step 1508. At the step 1508, a determination is made as to whether the distance computed in step 1506 is zero. If the step 1508 evaluates to yes, control proceeds to the step 1510. At the step 1510, it is determined that B1 and T1 match whereby B1 is fully deduplicated as a full block match for T1. The step 1510 is similar to the step 1408 of FIG. 14.

If the step 1508 evaluates to no, control proceeds to the step 1512 where a determination is made as to whether the distance is less than a specified threshold. Consistent with discussion herein, the distance denotes a measurement of similarity between the candidate data block B1 and a target data block T1. If the step 1512 evaluates to no, control proceeds to the step 1514 where it is determined that B1 and T1 are not similar. In connection with the step 1514, processing does not further examine T1 for a possible matching sub-block in B1. From the step 1514, control proceeds to the step 1522 where a determination is made as to whether processing of all existing targets has completed. If step 1522 evaluates to yes, control proceeds to the step 1526 where the candidate is not partially deduplicated and where the candidate block is stored as a new target block as denoted in the step 1416 of the FIG. 14. If the step 1522 evaluates to no, control proceeds to the step 1524 to obtain the next target block. From the step 1524, control proceeds to the step 1504 to continue partial or sub-block deduplication processing using the next target block as the current target block T1.

If the step 1512 evaluates to yes, control proceeds to the step 1516 where it is determined that B1 and T1 are similar. The step 1516 may include performing partial or sub-block deduplication for B1 with respect to T1. The step 1516 may include determining what sub-blocks of B1 can be stored as duplicates of the existing target block T1. From the step 1516, control proceeds to the step 1518 where a determination is made as to whether partial deduplication of B1 with respect to T1 was successful. Put another way, at the step 1518, a determination is made as to whether at least one sub-block of B1 can be deduplicated whereby the at least one sub-block of B1 is stored as a matching sub-block of T1. If the step 1518 evaluates to yes, control proceeds to the step 1520. At the step 1520, processing is performed to store the candidate block B1 as a partially deduplicated block having at least one sub-block matching at least one sub-block of the target block T1. The step 1520 is similar to the step 1414 of FIG. 14. If the step 1518 evaluates to no, control proceeds to the step 1522.

Figure 16:
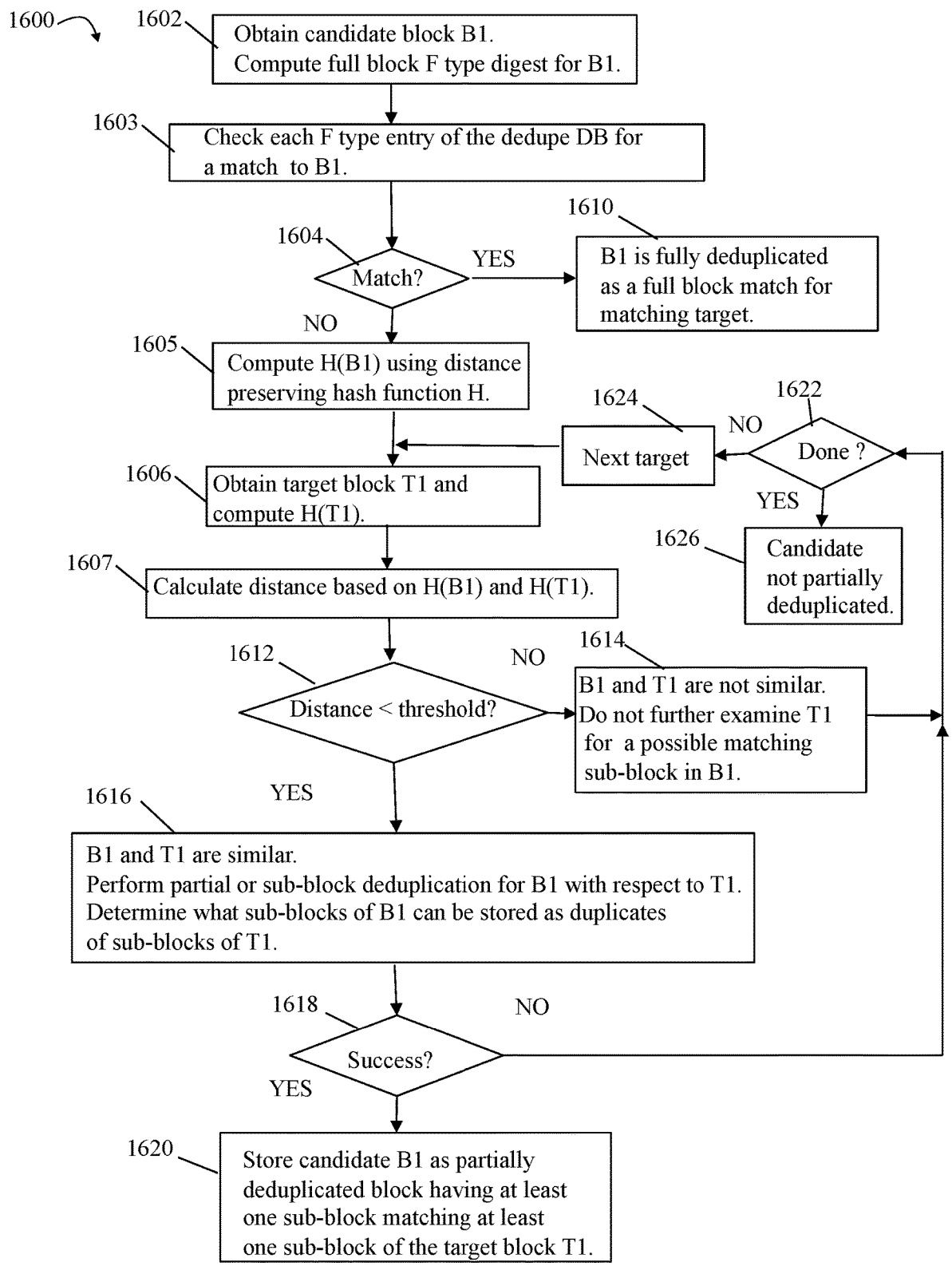

Referring to FIG. 16, shown is third flowchart 1600 of processing steps that may be performed in an embodiment in accordance with the techniques herein. The flowchart 1600 provides additional detail regarding one particular embodiment in which the distance function is computed, such as in EQUATION 2, based on the XOR of the hash values for the data blocks B1 and T1, where such hash values are computed using a distance preserving hash function. The flowchart 1600 indicates processing steps that may be performed for a single candidate block whereby the steps of the flowchart 1600 may be repeated for subsequent candidate blocks.

At the step 1602, the candidate block B1 is obtained. The step 1602 includes computing an F type digest for the candidate block B1. As described herein the F type digest for B1 may be computed using a hash function and the full block content of B1. The hash function used in computing the F type digest for B1 is a first hash function that is different than the second hash function H using to compute hash values used in determining the distance, such as in EQUATION 2. The first hash function may be stronger than the distance preserving hash function H used as the second hash function.

From the step 1602, control proceeds to the step 1603 where processing is performed to check each F type entry of the dedupe DB 150 for a match to B1. Step 1603 may include determining if there is an existing F type entry in the dedupe DB having a digest that matches the computed full block F type digest for B1 (as computed in the step 1602), and if so, comparing the actual content of the target data block having the matching entry to the content of B1. From the step 1603, control proceeds to the step 1604. At the step 1604, a determination is made as to whether a matching target block in the dedupe DB was found for the candidate block B1. If the step 1604 evaluates to yes, control proceeds to the step 1610. At the step 1610, B1 is processed as a full deduplicated block of the matching target block. The step 1610 is similar to the step 1408 of the FIG. 14. If the step 1604 evaluates to no, control proceeds to the step 1605 where processing is performed to compute H(B1) using the distance preserving hash function H. From the step 1605, control proceeds to the step 1606. At the step 1606, a target block T1 is obtained and H(T1) is computed. From the step 1606, control proceeds to the step 1607.

At the step 1607, processing is performed to calculate the distance between H(B1) and H(T1), such as using EQUATION 2. From the step 1607, control proceeds to the step 1612 where a determination is made as to whether the distance is less than a specified threshold. Consistent with discussion herein, the distance denotes a measurement of similarity between the candidate data block B1 and the target data block T1. If the step 1612 evaluates to no, control proceeds to the step 1614 where it is determined that B1 and T1 are not similar. In connection with the step 1614, processing does not further examine T1 for a possible matching sub-block in B1. From the step 1614, control proceeds to the step 1622 where a determination is made as to whether processing of all existing targets has completed. If step 1622 evaluates to yes, control proceeds to the step 1626 where the candidate is not partially deduplicated and where the candidate block is stored as a new target block as denoted in the step 1416 of the FIG. 14. If the step 1622 evaluates to no, control proceeds to the step 1624 to obtain the next target block. From the step 1624, control proceeds to the step 1504 to continue partial or sub-block deduplication processing using the next target block as the current target block T1.

If the step 1612 evaluates to yes, control proceeds to the step 1616 where it is determined that B1 and T1 are similar. The step 1616 may include performing partial or sub-block deduplication for B1 with respect to T1. The step 1616 may include determining what sub-blocks of B1 can be stored as duplicates of the existing target block T1. From the step 1616, control proceeds to the step 1618 where a determination is made as to whether partial deduplication of B1 with respect to T1 was successful. Put another way, at the step 1618, a determination is made as to whether at least one sub-block of B1 can be deduplicated whereby the at least one sub-block of B1 can be stored as a matching sub-block of T1. If the step 1618 evaluates to yes, control proceeds to the step 1620. At the step 1620, processing is performed to store the candidate block B1 as a partially deduplicated block having at least one sub-block matching at least one sub-block of the target block T1. The step 1620 is similar to the step 1414 of FIG. 14. If the step 1618 evaluates to no, control proceeds to the step 1622.

The techniques herein may be performed by any suitable hardware and/or software. For example, the techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing data comprising:
  receiving, using a processor, a candidate data block;
  computing, using a processor, a distance using a distance function, wherein the distance denotes a measurement of similarity between the candidate data block and a target data block, wherein the distance computed by the distance function is less than a second distance computed by the distance function for another pair of data blocks, and the distance denotes that the candidate data block and the target data block have a higher degree of similarity than the another pair of data blocks having the second distance;
  determining, using a processor, that the candidate data block is not a duplicate of the target block; and
  responsive to determining the candidate data block is not a duplicate of the target block, determining using a processor whether the distance is less than a threshold distance denoting a threshold level of similarity, and responsive to determining that the distance is less than the threshold distance, performing first processing
using a processor including:
determining that the candidate data block and the target
block have a level of similarity greater than the
threshold level of similarity denoted by the threshold
distance; and
performing partial data deduplication of the candidate
data block with respect to the target data block to
identify at least one sub-block of the candidate data
block that is a duplicate of at least one sub-block of
the target data block, wherein said partial data deduplication includes:
determining whether at least one sub-block of the
candidate data block matches at least one sub-block of the target data block; and
responsive to determining at least one sub-block of
the candidate data block matches at least one
sub-block of the target data block, performing
second processing that stores the candidate data
block as a partially deduplicated data block with at
least one sub-block that is a duplicate of another
sub-block of the target data block.

2. The method of claim 1, wherein the distance function computes the distance based on results of a logical exclusive-or operation of the candidate data block and the target data block.

3. The method of claim 2, wherein the distance function computes a normalized distance value as the distance.

4. The method of claim 2, further comprising:
responsive to determining the distance is less than the threshold distance, determining the candidate data block is similar to the target data block.

5. The method of claim 2, further comprising:
determining whether the distance is zero; and
responsive to determining the distance is zero, determining that the candidate data block is a duplicate of the target data block and storing the candidate data block as a duplicate of the target data block.

6. The method of claim 1, wherein the distance function computes the distance based on results of a bit-wise logical exclusive-or operation of a first digest and a second digest, wherein the first digest is computed for the candidate data block using a distance preserving hash function and wherein the second digest is computed for the target data block using the distance preserving hash function.

7. The method of claim 6, wherein the distance function computes a normalized distance value as the distance.

8. The method of claim 6, further comprising:
responsive to determining the distance is less than the threshold distance, determining the candidate data block is similar to the target data block.

9. The method of claim 6, further comprising:
determining whether a third digest matches a fourth digest, wherein the third digest is computed for the candidate data block using a second hash function and wherein the fourth digest is computed for the target data block using the second hash function, wherein the second hash function is a stronger hash function than the first hash function;
responsive to determining the third digest matches the fourth digest, comparing the candidate data block to the target data block;
determining, in accordance with said comparing whether the candidate data block matches the target data block; and responsive to determining the candidate data block matches the target data block, storing the candidate data block as a fully deduplicated data block.

10. The method of claim 9, wherein the first hash function is a non-cryptographic hash function and the second hash function is a cryptographic hash function.

11. The method of claim 10, wherein the first hash function, that is the distance preserving hash function, is a cyclic redundancy check (CRC) function that computes a first checksum as the first digest for the candidate data block and computes a second checksum as the second digest for the target data block.

12. The method of claim 1, wherein the method is performed as part of inline processing of the candidate data block in connection with an I/O path or data path when servicing an I/O accessing the candidate data block.

13. The method of claim 1, wherein the method is performed offline and not as part of inline processing of the candidate data block in connection with an I/O path or data path when servicing an I/O accessing the candidate data block.

14. A system comprising:
a processor; and
a memory comprising code stored thereon that, when executed, performs a method of processing data comprising:
receiving a candidate data block;
computing a distance using a distance function, wherein the distance denotes a measurement of similarity between the candidate data block and a target data block, wherein the distance computed by the distance function is less than a second distance computed by the distance function for another pair of data blocks, and the distance denotes that the candidate data block and the target data block have a higher degree of similarity than the another pair of data blocks having the second distance;
determining that the candidate data block is not a duplicate of the target block; and
responsive to determining the candidate data block is not a duplicate of the target block, determining whether the distance is less than a threshold distance denoting a threshold level of similarity, and responsive to determining that the distance is less than the threshold distance, performing processing including:
determining that the candidate data block and the target block have a level of similarity greater than the threshold level of similarity denoted by the threshold distance; and
performing partial data deduplication of the candidate data block with respect to the target data block to identify at least one sub-block of the candidate data block that is a duplicate of at least one sub-block of the target data block, wherein said partial data deduplication includes:
determining whether at least one sub-block of the candidate data block matches at least one sub-block of the target data block; and
responsive to determining at least one sub-block of the candidate data block matches at least one sub-block of the target data block, performing second processing that stores the candidate data block as a partially deduplicated data block with at least one sub-block that is a duplicate of another sub-block of the target data block.

15. A non-transitory computer readable medium comprising code stored thereon that, when executed, performs a method of processing data comprising:
receiving a candidate data block;
computing a distance using a distance function, wherein the distance denotes a measurement of similarity between the candidate data block and a target data block, wherein the distance computed by the distance function is less than a second distance computed by the distance function for another pair of data blocks, and the distance denotes that the candidate data block and the target data block have a higher degree of similarity than the another pair of data blocks having the second distance;
determining that the candidate data block is not a duplicate of the target block; and
responsive to determining the candidate data block is not a duplicate of the target block, determining whether the distance is less than a threshold distance denoting a threshold level of similarity, and responsive to determining that the distance is less than the threshold distance, performing processing including:
determining that the candidate data block and the target block have a level of similarity greater than the threshold level of similarity denoted by the threshold distance; and
performing partial data deduplication of the candidate data block with respect to the target data block to identify at least one sub-block of the candidate data block that is a duplicate of at least one sub-block of the target data block, wherein said partial data deduplication includes:
determining whether at least one sub-block of the candidate data block matches at least one sub-block of the target data block; and
responsive to determining at least one sub-block of the candidate data block matches at least one sub-block of the target data block, performing second processing that stores the candidate data block as a partially deduplicated data block with at least one sub-block that is a duplicate of another sub-block of the target data block.

16. A method of processing data comprising:
receiving a candidate data block;
computing, using a distance function, a distance between the candidate data block and a target data block, wherein the distance denotes a measurement of similarity between the candidate data block and a target data block, wherein said computing the distance between the candidate data block and the target data block includes:
computing a first digest for the candidate data block using a distance preserving hash function;
computing a second digest for the target data e block using the distance preserving hash function; and
computing the distance based on a result of a bit-wise logical exclusive-or operation of the first digest and the second digest;
determining whether the distance between the candidate data block and a target data block is zero;
responsive to determining the distance between the candidate data block and a target data block is zero, determining the candidate data block is a duplicate of the target data block and storing the candidate data block as a duplicate of the target data block; and
responsive to determining the distance between the candidate data block and a target data block is not zero, performing first processing including:
determining whether the distance is less than a threshold distance denoting a threshold level of similarity; and
responsive to determining the distance is less than the threshold distance, performing second processing including:
determining that the candidate data block and the target block have a level of similarity greater than the threshold level of similarity denoted by the threshold distance; and
performing partial data deduplication of the candidate data block with respect to the target data block to identify at least one sub-block of the candidate data block that is a duplicate of at least one sub-block of the target data block, wherein said partial data deduplication includes:
determining whether at least one sub-block of the candidate data block matches at least one sub-block of the target data block; and
responsive to determining at least one sub-block of the candidate data block matches at least one sub-block of the target data block, performing second processing that stores the candidate data block as a partially deduplicated data block with at least one sub-block that is a duplicate of another sub-block of the target data block.

17. The method of claim 16, wherein a first distance value is computed for a first pair of data blocks using the distance function and a second distance value is computed for a second pair of data blocks using the distance function, and wherein the first distance value is less than the second distance value, and the first pair of data blocks are determined as having a higher level of similarity than the second pair of data blocks.

18. A system comprising:
one or more processors; and
one or more memories comprising code stored thereon that, when executed, performs a method of processing data comprising:
receiving a candidate data block;
computing, using a distance function, a distance between the candidate data block and a target data block, wherein the distance denotes a measurement of similarity between the candidate data block and a target data block, wherein said computing the distance between the candidate data block and the target data block includes:
computing a first digest for the candidate data block using a distance preserving hash function;
computing a second digest for the target data e block using the distance preserving hash function; and
computing the distance based on a result of a bit-wise logical exclusive-or operation of the first digest and the second digest;
determining whether the distance between the candidate data block and a target data block is zero;
responsive to determining the distance between the candidate data block and a target data block is zero, determining the candidate data block is a duplicate of the target data block and storing the candidate data block as a duplicate of the target data block; and
responsive to determining the distance between the candidate data block and a target data block is not zero, performing first processing including:

determining whether the distance is less than a threshold distance denoting a threshold level of similarity; and responsive to determining the distance is less than the threshold distance, performing second processing including:

determining that the candidate data block and the target block have a level of similarity greater than the threshold level of similarity denoted by the threshold distance; and performing partial data deduplication of the candidate data block with respect to the target data block to identify at least one sub-block of the candidate data block that is a duplicate of at least one sub-block of the target data block, wherein said partial data deduplication includes:

determining whether at least one sub-block of the candidate data block matches at least one sub-block of the target data block; and responsive to determining at least one sub-block of the candidate data block matches at least one sub-block of the target data block, performing second processing that stores the candidate data block as a partially deduplicated data block with at least one sub-block that is a duplicate of another sub-block of the target data block.

19. A non-transitory computer readable medium comprising code stored thereon that, when executed, performs a method of processing data comprising:

receiving a candidate data block;

computing, using a distance function, a distance between the candidate data block and a target data block, wherein the distance denotes a measurement of similarity between the candidate data block and a target data block, wherein said computing the distance between the candidate data block and the target data block includes:

computing a first digest for the candidate data block using a distance preserving hash function;

computing a second digest for the target data e block using the distance preserving hash function; and computing the distance based on a result of a bit-wise logical exclusive-or operation of the first digest and the second digest;

determining whether the distance between the candidate data block and a target data block is zero;

responsive to determining the distance between the candidate data block and a target data block is zero, determining the candidate data block is a duplicate of the target data block and storing the candidate data block as a duplicate of the target data block; and responsive to determining the distance between the candidate data block and a target data block is not zero, performing first processing including:

determining whether the distance is less than a threshold distance denoting a threshold level of similarity; and responsive to determining the distance is less than the threshold distance, performing second processing including:

determining that the candidate data block and the target block have a level of similarity greater than the threshold level of similarity denoted by the threshold distance; and performing partial data deduplication of the candidate data block with respect to the target data block to identify at least one sub-block of the candidate data block that is a duplicate of at least one sub-block of the target data block, wherein said partial data deduplication includes:

determining whether at least one sub-block of the candidate data block matches at least one sub-block of the target data block; and responsive to determining at least one sub-block of the candidate data block matches at least one sub-block of the target data block, performing second processing that stores the candidate data block as a partially deduplicated data block with at least one sub-block that is a duplicate of another sub-block of the target data block.

* * * * *